United States Patent
Chavoshi et al.

(10) Patent No.: US 11,989,657 B2
(45) Date of Patent: May 21, 2024

(54) AUTOMATED MACHINE LEARNING PIPELINE FOR TIMESERIES DATASETS UTILIZING POINT-BASED ALGORITHMS

(71) Applicant: Oracle International Corporation, Redwood Shores, CA (US)

(72) Inventors: Nikan Chavoshi, Redwood City, CA (US); Anatoly Yakovlev, Hayward, CA (US); Hesam Fathi Moghadam, Sunnyvale, CA (US); Venkatanathan Varadarajan, Seattle, WA (US); Sandeep Agrawal, San Jose, CA (US); Ali Moharrer, Belmont, CA (US); Jingxiao Cai, Fremont, CA (US); Sanjay Jinturkar, Santa Clara, CA (US); Nipun Agarwal, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 885 days.

(21) Appl. No.: 17/071,285

(22) Filed: Oct. 15, 2020

(65) Prior Publication Data

US 2022/0121955 A1   Apr. 21, 2022

(51) Int. Cl.
*G06N 20/00* (2019.01)
*G06N 3/088* (2023.01)

(52) U.S. Cl.
CPC .............. *G06N 3/088* (2013.01); *G06N 20/00* (2019.01)

(58) Field of Classification Search
CPC ........ G06N 3/088; G06N 20/00; G06N 3/044; G06N 3/045; G06N 3/084; G06N 5/01
See application file for complete search history.

(56) References Cited

U.S. PATENT DOCUMENTS 10,832,158 B2   11/2020   Liu
2002/0169735 A1   11/2002   Kil et al.
(Continued)

FOREIGN PATENT DOCUMENTS

EP   2 128 798 A1   12/2009
EP   3 101 599 A2   12/2016
(Continued)

OTHER PUBLICATIONS

Busseti, Enzo, Ian Osband, and Scott Wong. "Deep learning for time series modeling." Technical report, Stanford University (2012): 1-5 (Year: 2012).*

(Continued)

*Primary Examiner* — Andrew T McIntosh
(74) *Attorney, Agent, or Firm* — Hickman Becker Bingham Ledesma LLP; Brian Miller

(57) ABSTRACT

Herein, a computer generates and evaluates many preprocessor configurations for a window preprocessor that transforms a training timeseries dataset for an ML model. With each preprocessor configuration, the window preprocessor is configured. The window preprocessor then converts the training timeseries dataset into a configuration-specific point-based dataset that is based on the preprocessor configuration. The ML model is trained based on the configuration-specific point-based dataset to calculate a score for the preprocessor configuration. Based on the scores of the many preprocessor configurations, an optimal preprocessor configuration is selected for finally configuring the window preprocessor, after which, the window preprocessor can optimally transform a new timeseries dataset such as in an offline or online production environment such as for real-time processing of a live streaming timeseries.

20 Claims, 8 Drawing Sheets

(56) References Cited

U.S. PATENT DOCUMENTS

| | | | |
|---|---|---|---|
| 2014/0344193 | A1 | 11/2014 | Bilenko et al. |
| 2014/0379904 | A1* | 12/2014 | Shimasaki .......... H04L 43/0805 709/224 |
| 2015/0193595 | A1* | 7/2015 | McNamara .......... A61B 5/0205 705/2 |
| 2016/0358099 | A1 | 12/2016 | Sturlaugson et al. |
| 2017/0061329 | A1 | 3/2017 | Kobayashi et al. |
| 2017/0169360 | A1 | 6/2017 | Veeramachaneni et al. |
| 2018/0022539 | A1 | 1/2018 | Vedani |
| 2018/0060738 | A1 | 3/2018 | Achin et al. |
| 2018/0109589 | A1 | 4/2018 | Ozaki et al. |
| 2018/0225391 | A1 | 8/2018 | Sali et al. |
| 2018/0246941 | A1* | 8/2018 | Salunke ............. G06F 16/2477 |
| 2018/0349986 | A1 | 12/2018 | Fidanza et al. |
| 2019/0095756 | A1 | 3/2019 | Agrawal |
| 2019/0095818 | A1 | 3/2019 | Varadarajan |
| 2019/0095819 | A1 | 3/2019 | Varadarajan |
| 2019/0370695 | A1 | 12/2019 | Chandwani et al. |
| 2019/0392255 | A1 | 12/2019 | Franklin |
| 2020/0076841 | A1 | 3/2020 | Hajimirsadeghi |
| 2020/0082013 | A1 | 3/2020 | Triplet et al. |
| 2020/0118036 | A1 | 4/2020 | Karnagel |
| 2020/0183946 | A1* | 6/2020 | Pelloin .................... G06F 17/18 |
| 2020/0242000 | A1* | 7/2020 | Khosrowpour ..... G06F 11/3608 |
| 2020/0327357 | A1 | 10/2020 | Karnagel |
| 2020/0327448 | A1 | 10/2020 | Yakovlev |
| 2020/0357012 | A1* | 11/2020 | Kendall ............. G06Q 20/3433 |
| 2021/0011832 | A1 | 1/2021 | Togawa |
| 2021/0089927 | A9 | 3/2021 | Ryan |
| 2021/0248416 | A1* | 8/2021 | Navon .................... G06N 20/00 |
| 2021/0390389 | A1* | 12/2021 | Limotta .................... G06N 3/08 |
| 2021/0398641 | A1* | 12/2021 | Catani .................... G16H 20/60 |
| 2022/0100558 | A1* | 3/2022 | Jia .......................... G06N 20/00 |

FOREIGN PATENT DOCUMENTS

| | | |
|---|---|---|
| WO | WO 2008/133509 A1 | 11/2008 |
| WO | WO2020/185101 | 1/2021 |

OTHER PUBLICATIONS

Ismail Fawaz, Hassan, et al. "Deep learning for time series classification: a review." Data mining and knowledge discovery 33.4 (2019): 917-963 (Year: 2019).*

Oreshkin, Boris N., et al. "N-BEATS: Neural basis expansion analysis for interpretable time series forecasting." arXiv preprint arXiv: 1905.10437 (2019) (Year: 2019).*

Gonzalez et al., "Batch Bayesian Optimization via Local Penalization", Proceedings of the 19th International Conference on Artificial Intelligence and Stats JMLR: W&CP vol. 41, dated 2016, 10 pages.

Conneau et al. "Supervised Learning of Universal Sentence Representations from Natural Language Inference Data", Dated Jul. 21, 2017, 12 pages.

Dai et al., "Semi-supervised Sequence Learning", dated 2015, 9 pages.

Doan et al., "Algorithm Selection Using Performance and Run Time Behavior", Chapter, Artificial Intelligence: Methodology, Systems and Applicationsm AIMSA dated Sep. 2016, pp. 3-13.

Doan et al., "Selecting Machine Learning Algorithms using Regression Models", https://www.researchgate.net/publication/304298580, dated Nov. 2015, 8 pages.

Du et al. DeepLog: Anomaly Detection and Diagnosis from System Logs through Deep Learning, CCS'17, Oct. 30-Nov. 3, 2017, 14 pages.

Faloutsos et al., "Fast Subsequence Matching in Time Series Databases", dated 1998, 11 pages.

Feurer et al. "Efficient and Robust Automated Machine Learning", dated 2015, 9 pages.

Feurer et al., "Initializing Bayesian Hyperparameter Optimization via Meta-Learning", Proceedings of the Twenty-Ninth AAAI Conference on Artificial Intelligence dated 2015, 8 pages.

Feurer et al., "Using Meta-Learning to Initialize Bayesian Optimization of Hyperparameters", dated 2014, 8 pages.

Filchenkjov et al., "Datasets Meta-Feature Description for Recommending Feature Selection Algorithm", dated Nov. 2015, 9 pages.

Furnkranz et al., "An Evaluation of Landmarking Variants", dated 2001, 12 pages.

Kolosnjaji et al., "Deep Learning for Classification of Malware System Call Sequences", dated 2016, 12 pages.

Gonnet et al., Automatic Problem-Specific Hyperparameter Optimization and Model Selection for Supervised Machine Learning, Technical Report, dated Jan. 1, 2015, 54 pages.

Castiello et al., "Meta-data: Characterization of Input Features for Meta-learning", Springer-Verlag Berlin Heidelberg dated 2005, 13 pages.

Guyon et al., "An Introduction to Variable and Feature Selection", Journal of Machine Learning Research 3 dated 2003, 26 pages.

HaddadPajouh et al, "A Two-layer Dimension Reduction and Two-tier Classification Model for Anomaly-Based Intrusion Detection in IoT Backbone Networks", dated 2016, 12 pages.

Hill et al., "Learning Distributed Representations of Sentences from Unlabelled Data", dated Feb. 10, 2016, 11 pages.

Hochreiter, Sepp, "Long Short Term Memory", Nural Computation, dated Nov. 15, 1997, 46 pages.

Hutter et al., "Automatic Machine Learning: Methods, Systems, Challenges", dated Oct. 16, 2018, 250 pages.

Hutter et al., "Sequential Model-Based Optimization for General Algorithm Configuration", Conference on the Theory and Applications of Cryptographic Techniques, dated Jan. 17, 2011. 17 pages.

J.D Wichard, "Model Selection in an Ensemble Framework", The 2013 International Joint Conference on Neural Networks, dated Jan. 1, 2006, pp. 2187-2192.

Jomaa et al., "Dataset2Vec: Learning Dataset Meta-Features", dated May 5, 2019, 20 pages.

Kim et al., "Learning to Transfer Initializations for Bayesian Hyperparameter Optimization", 31st Conference on Neural Information Processing Systems dated 2017, Long Beach, CA, USA, 5 pages.

Kiros et al., "Skip-Thought Vectors", dated 2015, 9 pages.

"Machine Learning Approaches for Time Series Data" dated May 19, 2019, 25 pages.

Ghosh et al., "Detecting Anomalous and Unknown Intrusions Against Programs", dated 1998, 9 pages.

Bergstra et al., "Making a Science of Model Search: Hyperparameter Optimization in Hundreds of Dimensions for Vision Architectures", JMLR: W &CP, vol. 28, dated 2013, 9 pages.

Abe et al., "Developing an Integrated Time-Series Data Mining Environment for Medical Data Mining", Seventh IEEE International Conference on Data Mining—Workshops, dated 2007, 6 pages.

Ahmed et al., "An Empirical Comparison of Machine Learning Models for Time Series Forecasting", dated Sep. 15, 2010, 31 pages.

Albon, Chris, "ANOVA F-Value for Feature Selection", dated Dec. 20, 2017, 2 pages.

Aldave et al., "Systematic Ensemble Learning fro Regression" dated Mar. 28, 2014, pp. 1-38.

Amazon SageMaker, "DeepAR Forecasting Algorithm", https://docs.aws.amazon.com/sagemaker/latest/dg/deepar.html,last viewed on Jun. 29, 2020, 5 pages.

Andrychowicz et al., "Learning to learn by gradient descent by gradient descent", 30th Conference on Neural Information Processing Systems dated (NIPS 2016), Barcelona, Spain, 9 pages.

Artificial Intelligence Blog, "Announcing automated ML capability in Azure Machine Learning", dated Sep. 24, 2018, 8 pages.

Bardenet et al., "Collaborative hyperparameter tuning", Proceedings of the 30 th International Conference on Machine Learning, Atlanta, Georgia, USA, 2013, 9 pages.

Bengio et al., "A Neural Probabilistic Language Model", Journal of Machine Learning Research 3, dated Feb. 2003, 19 pages.

Bensusan et al., "Casa Batlo is in Passeig de Gracia or how landmark performances can describe tasks", dated 2000, 19 pages.

Bensusan et al., "Discovering Task Neighbourhoods through Landmark Learning Performances", Springer-Verlag Berlin Heidelberg dated 2000, 6 pages.

(56) References Cited

OTHER PUBLICATIONS

Chen Chi-Ou et al., "Machine Learning-Based Configuration Parameter Tuning on Hadoop System", dated Jun. 27, 2015, IEEE, pp. 386-392.
Bergstra et al., "Hyperparameter Optimization and Boosting for Classifying Facial Expressions: How good can a "Null" Model be?", ICML Workshop on Representation and Learning, dated 2013, 7 pages.
Chandrashekar et al., "A survey on feature selection methods", Computers and Electrical Engineering 40 dated 2014, 13 pages.
Bergstra et al., "Random Search for Hyper-Parameter Optimization", Journal of Machine Learning Research 13 (2012) 281-305, dated Feb. 2012, 25 pages.
Berlin et al., "Malicious Behavior Detection using Windows Audit Logs", dated Aug. 25, 2015, 10 pages.
Bolon-Canedo et al., "Distributed Feature Selection: An Application to Microarray Data Classification", Applied Soft Computing, dated Feb. 7, 2015, 16 pages.
Bontemps et al., "Collective Anomaly Detection based on Long Short Term Memory Recurrent Neural Network", dated 2016, 12 pages.
Brazdil et al., "Ranking Learning Algorithms: Using IBL and Meta-Learning on Accuracy and Time Results", dated 2003 Kluwer Academic Publishers. Manufactured in The Netherlands, 27 pages.
Brazdil, Pavel, "Metalearning and Algorithm Selection: Progress, State of the Art and Introduction of the 2018 Special Issue", dated Dec. 2017, 23 pages.
Brown et al., "Conditional Likelihood Maximisation: A Unifying Framework for Information Theoretic Feature Selection", Journal of Machine Learning Research 13 (2012), 40 pages.
Brownlee, Jason, "Time Series Forecasting as Supervised Learning", dated Aug. 21, 2019, 2 pages.
Buczak et al., "A Survey of Data Mining and Machine Learning Methods for Cyber Security Intrusion Detection", IEEE Communications Surveys & Tutorials, vol. 18, No. 2, Second Quarter 2016, 24 pages.
Camerra et al., "Beyond one billion time series: indexing and mining very large time series collections with iSAX2+", dated Feb. 16, 2013, 29 pages.
Caruana et al., "Ensemble Selection From Libraries of Models", Proceedings, Twenty-First International Conference on Machine Learning: dated Jul. 2004, 8 pages.
Krupka et al., "Learning to Select Features using their Properties", Journal of Machine Learning Research 9, dated 2008, 28 pages.
Bergstra et al., "Hyperopt: A Python Library for Optimizing the Hyperparameters of Machine Learning Algorithms", Proc. of the 12th Python in Science Conf. (SCIPY 2013), dated 2013, 8 pages.
Snoek et al., "Scalable Bayesian Optimization Using Deep Neural Networks", dated 2014, 10 pages.
Pinter, Janos, "Calibrating Artificial Neural Networks by Global Optimization", Technical Report, Özyeğin University, Istanbul Submitted for publication: Jul. 2010, 17 pages.
Plotz et al., "Feature Learning for Activity Recognition in Ubiquitous Computing", dated Jan. 2011, 7 pages.
Prasad et al., "Distributed Feature Selection Using Vertical Partitioning for High Dimensional Data", ICACCI, dated Sep. 12, 2016, 8 pages.
Pudil et al., "Floating Search Methods in Feature Selection", dated Jun. 19, 1993, 9 pages.
Reif et al., "Prediction of Classifier Training Time including Parameter Optimization", dated Oct. 2011, 13 pages.
Ruder, Sebastian, "An Overview of Gradient Descent Optimization Algorithms", dated Jun. 15, 2017, 14 pages.
Schoenfeld et al., "Preprocessor Selection for Machine Learning Pipelines", dated 2018, 7 pages.
Scikit Learn, "3.2. Tuning the hyper-parameters of an estimator", http://scikitlearn.org/stable/modules/grid_search.html, dated 2017, 6 pages.
Seleznyov et al., "Anomaly Intrusion Detection Systems: Handling Temporal Relations between Events", dated 1999, 12 pages.
Shipmon et al., "Time Series Anomaly Detection", Detection of Anomalous Drops with Limited Features and Sparse Examples in Noisy Highly Periodic Data, dated 2017, 9 pages.
Simpson et al, "Automatic Algorithm Selection in Computational Software Using Machine Learning", dated 2016, 10 pages.
Kohavi, Ron, "Wrappers for Performance Enhancement and Oblivious Decision Graphs", dated Sep. 1995, 304 pages.
Snoek et al., "Input Warping for Bayesian Optimization of Non-Stationary Functions", Proceedings of the 31 st International Conference on Machine Learning, Beijing, China, 2014, 9 pages.
Parmezan et al., "Metalearning for Choosing Feature Selection Algorithms in Data Mining: Proposal of a New Framework", Preprint submitted to Expert Systems with Applications, Nov. 4, 2016, 66 pgs.
Snoek, "Practical Bayesian Optimization of Machine Learning Algorithms", dated 2012, 9 pages.
Song et al., "Deep r-th Root of Rank Supervised Joint Binary Embedding for Multivariate Time Series Retrieval", KDD 2018, dated Aug. 19-23, 2018, London, United Kingdom, 10 pages.
Sutskever et al., "Sequence to Sequence Learning with Neural Networks", dated 2014, 9 pages.
Swersky et al., "Multi-Task Bayesian Optimization", dated 2013, 9 pages.
Thornton et al., "Auto-WEKA: Combined Selection and Hyperparameter Optimization of Classification Algorithms", New York, New York, dated Mar. 6, 2013, 9 pages.
Tuor et al., "Deep Learning for Unsupervised Insider Threat Detection in Structured Cybersecurity Data Streams", dated Dec. 15, 2017, 9 pages.
Usama et al., "Unsupervised Machine Learning for Networking: Techniques, Applications and Research Challenges", dated Sep. 19, 2017, 37 pages.
Wang et al., "Experimental comparison of representation methods and distance measures for time series data", dated Feb. 12, 2010, 35 pages.
Weinberger et al., "Unsupervised learning of image manifolds by semidefinite programming", IEEE, dated Jun. 27, 2004, 10 pages.
Yogatama et al., "E cient Transfer Learning Method for Automatic Hyperparameter Tuning", Proceedings of the 17th International Conference on Artifical Intelligence and Statistics dated 2014, 9 pages.
Yousefi-Azar et al., "Autoencoder-based Feature Learning for Cyber Security Applications", dated 2017, 8 pages.
Singh et al., "Literature Review on Feature Selection Methods for High-Dimensional Data", International Journal of Computer Applications, vol. 136, No. 1, dated Feb. 2016, 9 pages.
Microsodt Docs, "Feature Selection in the Team Data Science Process", dated Nov. 20, 2017, 5 pages.
Kuck et al, "Meta-learning with neural networks and landmarking for forecasting model selection an empirical evaluation of different feature sets applied to industry data", dated Jul. 24-29, 2016, 8pgs.
Le et al., "Distributed Representations of Sentences and Documents", Proceedings of the 31 st International Conference on Machine Learning, Beijing, China, dated 2014, 9 pages.
Lemke et al., "Metalearning: a survey of trends and technologies", Artif Intell Rev dated 2015,14 pages.
Li et al., "Feature Selection: A Data Perspective", AMC, Computer Suru 9, Article 39, dated Mar. 2010, 45 pages.
Lim et al., "A Comparison of Prediction Accuracy, Complexity, and Training Time of Thirty-Three Old and New Classification Algorithms", dated 2000, 26 pages.
Lin et al., "Experiencing SAX: a novel symbolic representation of time series", dated Apr. 3, 2007, 38 pages.
Lindne et al., "AST: Support for Algorithm Selection with a CBR Approach", Springer-Verlag Berlin Heidelberg 1999, 6 pages.
Liu et al., "Detecting and Preventing Cyber Insider Threats: A Survey", IEEE Communications Survey & Tutorials, dated 2018, 21 pages.
Loganathan Gobinath et al., "Sequence to Sequence Pattern Learning Algorithm for Real-Time Anomaly Detection in Network Traffic", dated 2018 IEEE, dated May 13, 2018, pp. 1-4.
Luo et al., "A Revisit of Sparse Coding Based Anomaly Detection in Stacked RNN Framework", dated Oct. 2017, 9 pages.

(56) References Cited

OTHER PUBLICATIONS

Malhotra et al., "Long Short Term Memory Networks for Anomaly Detection in Time Series", ESANN dated Apr. 22, 2015 proceedings, European Symposium on Artificial Neural Networks, 6 pages.
Pedregosa, Fabian, "Hyperparameter Optimization with Approximate Gradient", Proceedings of the 33rd International Conference on Machinelearning, New York, vol. 48, dated Jun. 26, 2016, pp. 1-15.
Mendes-Moreira et al., "Ensemble Approaches for Regression", ACM Computing Surveys, ACM, New York, NY vol. 45, No. 1, dated Dec. 7, 2012, pp. 1-40.
Peskova et al., "Hybrid Multi-Agent System for Metalearning in Data Mining", dated Sep. 19, 2014, 2 pages.
Microsoft Docs, "Feature Selection Modules", dated May 5, 2019, 7 pages.
Mikolov et al., "Distributed Representations of Words and Phrases and their Compositionality", dated 2013, 9 pages.
Mikolov et al., "Efficient Estimation of Word Representations in Vector Space", dated Sep. 7, 2013, 12 pages.
Mirza Ali H et al., "Computer Network Intrusion Detection Using Sequwnrial LSTM Neural Networks Autoencoders", dated May 2, 2018, 2018 26th Signal Processing and Communicaitons Applications Con. 4 pgs.
Mnih et al., "A Scalable Hierarchical Distributed Language Model", dated 2009, 8 pages.
Molina et al., "Feature Selection Algorithms: A Survey and Experimental Evaluation", dated 2002, 19 pages.
Moran-Fernandez et al., "Centralized vs. Distributed Feature Selection Methods Based on Data Complexity Measures", Knowledge-based Systems, dated Sep. 28, 2016, 20 pages.
Narendra et al., "A Branch and Bound Algotithm for Feature Subset Selection", IEEE Transactions on Computers, vol. C-26, No. 9, dated Dec. 1977, 6 pages.
Nelder et al., "A Simplex Method for Function Minimization", The Computer Journal, vol. 7, dated Apr. 1, 1964, pp. 308-313.
Ng, "Data preprocessing for machine learning: options and recommendations", dated Jun. 22, 2020, 12 pages.
Paoli et al., "Forecasting of preprocessed daily solar radiation time series using neural networks", Solar Energy, Elsevier, dated 2010, 43 pages.
YuanZhong, Zhu, "Intrusion Detection Method based on Improved BP Neural Network Research", International Journal of Security and Its Applications vol. 10, No. 5 (2016) pp. 193-202.
Malhotra et al., "LSTM-based Encoder-Decoder for Multi-sensor Anomaly Detection", Presented at ICML 2016 Anomaly Detection Workshop, New York, NY, USA, 2016. Copyright 2016—5 pages.
Zhen Hua Liu et al. "JSON Data Management in RDBMS", Emerging Technologies and Applications in Data Processing and Management, dated May 13, 2019, pp. 20-45.
Knut Anders Hatlen, "Partial Update of JSON Values", MySQL Server Blog, dated Apr. 3, 2018, 6 pages.
Bryan P et al., "JavaScript Object Notation (JSON) Patch; rfc6902.txt", Javascript Object Notation (JSON) Patch, Internet Engineering Task Force, Standard, Internet Society, Apr. 3, 2013, 18 pages.
Lim et al., "Deep Probabilistic Modelling of Price Movements for High-Frequency Trading", https://arxiv.org/pdf/2004.01498.pdf, dated 2020, 8 pages.
Amasyali et al., "A Study of Meta Learning For Regression", http://docs.lib.purdue.edu/ecetr, dated Jul. 1, 2009, 26 pages.
Bergmeir et al., "A Note on the Validity of Cross-Validation for Evaluating Time Series Prediction", Department of Econometrics and Business Statistics, http://www.buseco.monash.edu.au/depts/ebs/pubs/wpapers/, dated 2018, 17 pages.
De Livera, "Automatic Forecasting with a Modified Exponential Smoothing State space Framework", Department of Econometrics and Business Statistics, http://www.buseco.monash.edu.au/depts/ebs/pubs/wpapers/, dated 2010, 30 pages.
Fildes et al., "An Evaluation of Simple Forecasting Model Selection Rules", Lancaster University Management School, http://www.lums.lancs.ac.uk/publications, dated 2013, 32 pages.
Hutter et al., Algorithm Runtime Prediction: Methods & Evaluation, Artificial Intelligence 206, Oct. 2013, 33 pages.
Hyndman, "Automatic Time Series Forecasting: The Forecast Package for R", Journal of Statistical Software, vol. 27, Issue 3, http://www.jstatsoft.org/, dated Jul. 2008, 22 pages.
Alexandrov et al., "GluonTS: Probabilistic and Neural Time Series Modeling in Python", Journal of Machine Learning Research 21 (2020) 1-6, http://jmlr.org/papers/v21/19-820.html, dated Apr. 20, 2020, 6 pages.
Jung et al., "A Worrying Analysis of Probabilistic Time-Series Models for Sales Forecasting", 1st I Can't Believe It's Not Better Workshop, http://proceedings.mlr.press/v137/jung20a/jung20a.pdf, dated 2020, 8 pages.
Yakovlev et al., "Oracle AutoML: A Fast and Predictive AutoML Pipeline", Proceedings of the VLDB Endowment, vol. 13, No. 12, DOI: https://doi.org/10.14778/3415478.3415542, dated 2020, 15 pages.
Löning et al., "SKTIME: A Unified Interface for Machine Learning with Time Series", https://github.com/alan-turing-institute/sktime, dated 2019, 9 pages.
Ng et al., "Orbit: Probabilistic Forecast with Exponential Smoothing", arXiv:2004.08492v4 [stat.CO], dated 2020, 6 pages.
Oreshkin et al., "N-Beats: Neural Basis Expansion Analysis for Interpretable Time Series Forecasting", published as a conference paper at ICLR 2020, arXiv:1905.10437v4 [cs.LG], dated 2019, 31 pages.
Salinas et al., "DeepAR: Probabilistic Forecasting with Autoregressive Recurrent Networks", Elsevier, https://doi.org/10.1016/j.ijforecast.2019.07.001, dated 2020, 11 pages.
Shah et al., "AutoAI-TS: AutoAI for Time Series Forecasting", Conference'17, Jul. 2017, Washington, DC, https://dl.acm.org/doi/abs/10.1145/3448016.3457557, dated Mar. 8, 2021, 13 pages.
Taylor et al., "Forecasting at Scale", PeerJ Preprints, https://doi.org/10.7287/peerj.preprints.3190v2, dated Sep. 27, 2017, 25 pages.
Jiang et al., "Markov Cross-Validation for Time Series Model Evaluations", Elsevier, Information Sciences (2016), doi: 10.1016/j.ins.2016.09.061, dated 2017, 29 pages.
Alexey Tsymbal, "The Problem of Concept Drift: Definitions and Related Work", dated Apr. 29, 2004, 7 pages.
Bach et al., A Bayesian Approach to Concept Drift, dated 2010, 9 pages.
Bontemps et al., "Collective Anomaly Detection based on Long Short Term Memory Recurrent Neural Network", dated Mar. 2017, 13 pages.
Gama et al., "A Survey on Concept Drift Adaptation", ACM Computing Surveys, vol. 1, No. 1, Article 1, Publication date: Jan. 2013, 44 pages.
Golan et al., "Deep Anomaly Detection Using Geometric Transformations", 32nd Conference on Neural Information Processing Systems (NeurIPS dated 2018), Montréal, Canada, 12 pages.
Hu et al., "Anomalous User Activity Detection in Enterprise Multi-Source Logs", dated Nov. 2017, 8 pages.
Sabokrou et al., "Real-Time Anomaly Detection and Localization in Crowded Scenes", dated 2015, 7 pages.
Kim et al., "Behavior-based anomaly detection on big data", Edith Cowan University, Research Online, dated 2015, 9 pages.
Kolter et al., "Dynamic Weighted Majority: An Ensemble Method for Drifting Concepts", Journal of Machine Learning Research 8, dated 2007, 36 pages.
Naseer et al., "Enhanced Network Anomaly Detection Based on Deep Neural Networks", Journal of Latex Class Files, vol. 14, No. 8, Aug. 2015, 16 pages.
N. Krishnavardhan, "A Framework to Identify Cybercrime Using Data Analytics", International Journal of Pure and Applied Mathematics, vol. 120, No. 6 dated Jun. 11, 2018, 14 pages.
Moustafa et al., "A holistic review of Network Anomaly Detection Systems: A comprehensive survey", Journal of Network and Computer Applications vol. 128, Feb. 15, 2019, pp. 33-55.
Malhotra et al., "Long Short Term Memory Networks for Anomaly Detection in Time Series", ESANN dated Apr. 2015 proceedings, 6 pages.
Luo, "A Revisit of Sparse Coding Based Anomaly Detection in Stacked RNN Framework", IEEE, dated 2017, 9 pages.

(56) References Cited

OTHER PUBLICATIONS

Webb et al., Characterizing Concept Drift, Data Mining and Knowledge Discovery, dated Jul. 2016, 30 pages.

* cited by examiner

FIG. 4
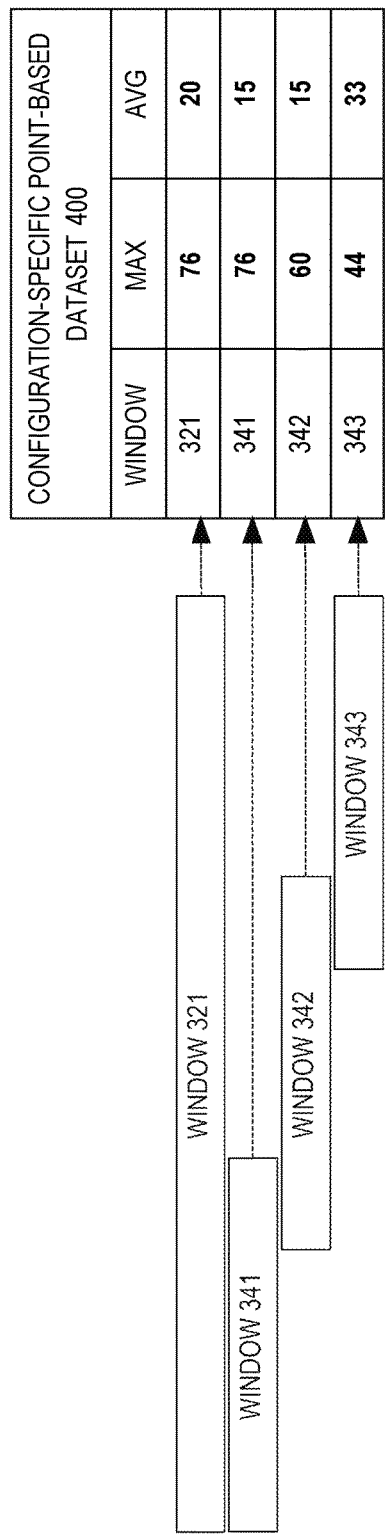
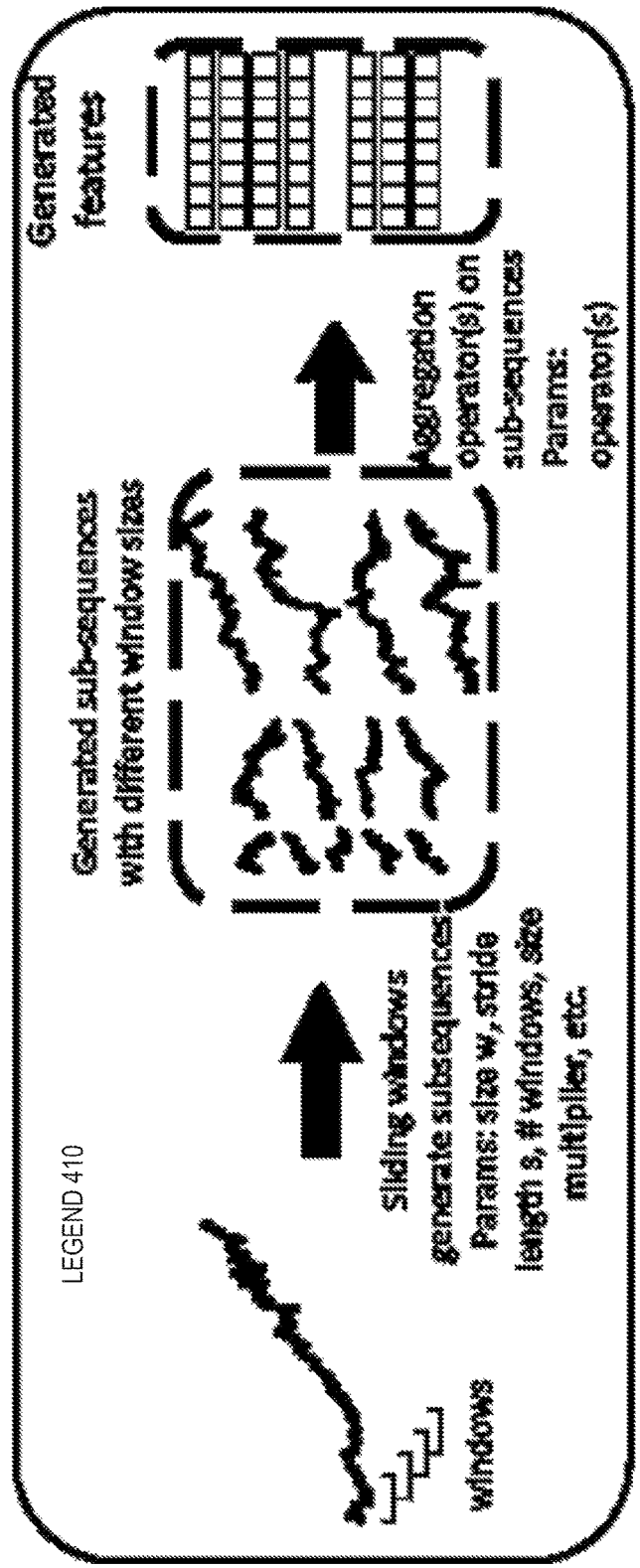

FIG. 5

COMPUTER 500

| ORIGINAL FEATURES 510 | | | | | |
|---|---|---|---|---|---|
| TIMESTAMP | COLOR | QUANTITY | PRICE | TAX | STYLE |

| | DERIVED FEATURES 531 | | | | |
|---|---|---|---|---|---|
| PREPROCESSOR CONFIGURATION 521 | COUNT(COLOR=RED) | AVG(PRICE) | NDV(COLOR) | NDV(STYLE) | STDDEV(PRICE) |

| | DERIVED FEATURES 532 | | |
|---|---|---|---|
| PREPROCESSOR CONFIGURATION 522 | MAX(PRICE) | AVG(PRICE) | STDDEV(QUANTITY) |

AUTOMATED MACHINE LEARNING PIPELINE FOR TIMESERIES DATASETS UTILIZING POINT-BASED ALGORITHMS

FIELD OF THE INVENTION

The present invention relates to machine learning for timeseries data. Herein are preprocessor optimization techniques for machine learning algorithms that need not be designed for timeseries data.

BACKGROUND

A timeseries is a collection of observations made sequentially in time. There are many examples of timeseries data, including sensors data, electronic transactions, and medical tests such as electrocardiogram (ECG) and electroencephalogram (EEG). Some timeseries data include trends, seasonality, and other characteristics such as average value and deviations from that. The primary goal of timeseries processing is to capture such patterns.

Most machine learning algorithms cannot accept timeseries data. Typical attempts to tame timeseries data entail limited processing such as normalization and standardization. Even state of the art processing of timeseries data, such as piecewise aggregate approximation (PAA) and symbolic aggregate approximation (SAX), have substantial shortcomings that limit their applicability.

Some techniques, such as standardization, normalization, and difference transform, do not have parameters to tune. But others such as PAA and SAX have parameter(s) that need to be set and/or tuned. These parameters are set either using domain knowledge expertise or manually by tediously running many trials and picking the best result.

Application of Machine learning is becoming ubiquitous, but data science expertise still remains and will remain scarce. Dependence on data scientists for tuning for every machine learning model will not be sustainable or scalable for enterprises. Thus, tuning for timeseries analytics needs automation innovation.

BRIEF DESCRIPTION OF THE DRAWINGS

In the drawings:

FIG. 4 is a block diagram that depicts an example computer that has nested processing of windows of different window sequences for a same preprocessor configuration;

FIG. 5 is a block diagram that depicts an example computer that explores a multidimensional problem space that is based on a multivariate timeseries dataset and a multidimensional preprocessor configuration space;

DETAILED DESCRIPTION

Figure 1:
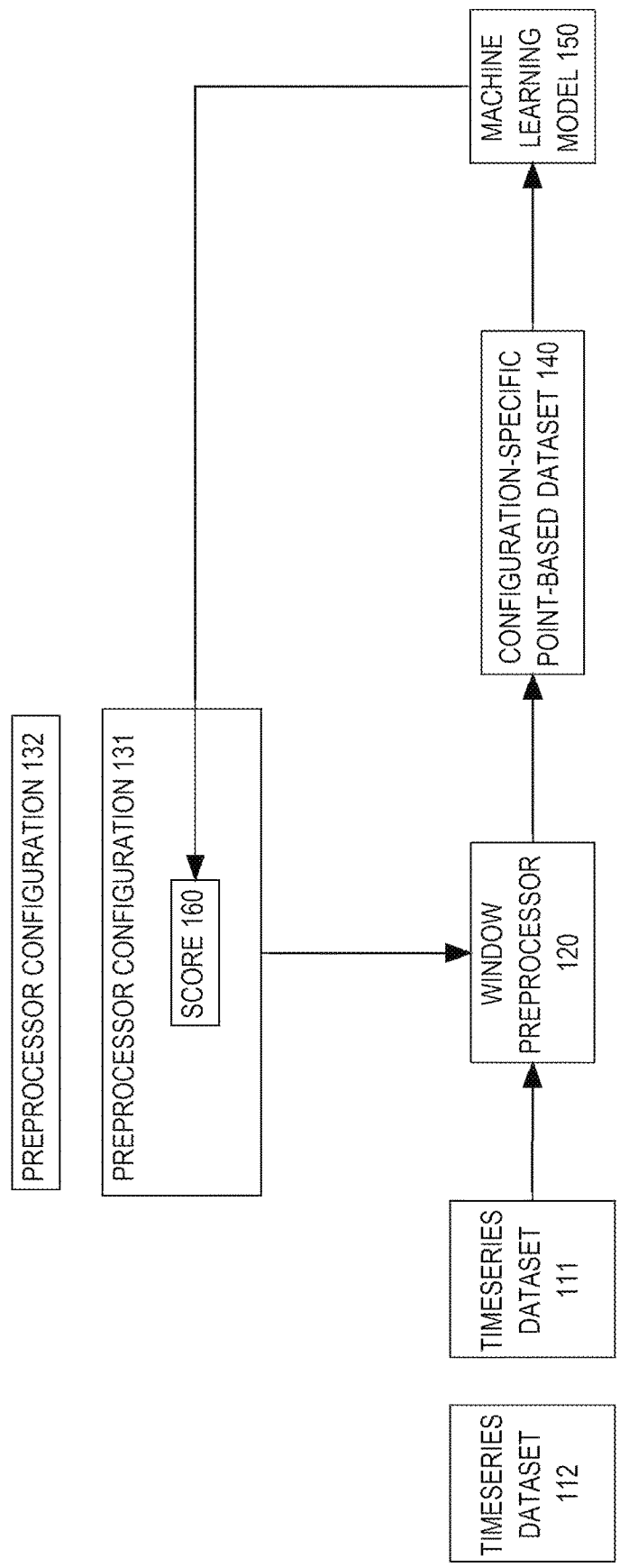
FIG. 1 is a block diagram that depicts an example computer that optimally configures a timeseries preprocessor for machine learning (ML) algorithms that need not be designed for timeseries data.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A dataset preprocessor is a software component that preprocesses a dataset, that is, transforms an original dataset into a more useful dataset. For example, dataset preprocessing may include transforming a dataset by: a) adding information to the dataset such as context, b) removing unwanted information from the dataset to prevent confusion, or c) reformatting the dataset to suit structural expectations of other software that will accept and process the transformed dataset. For example, a dataset preprocessor may occur in a dataflow to accept an original dataset from upstream and generate and emit a transformed dataset for downstream consumption or persistence. To facilitate exposition herein, a dataset preprocessor may be referred to herein as performing an action, such as preprocessing, when in fact a computer executing software of the preprocessor is performing the action.

Herein, a dataset preprocessor is configurable according to various configuration settings that may be adjusted to various values. A preprocessor configuration is a set of values for configuration settings with which a dataset preprocessor may be configured to adjust the behavior of the dataset preprocessor. In determining the behavior of a dataset preprocessor, the preprocessor configuration also determines the format and content of the transformed dataset. For example, a same original dataset may be twice preprocessed according to two different preprocessor configurations to generate two different transformed datasets that are configuration specific such that differences between the two preprocessor configurations cause differences in the format and/or content of the two transformed datasets.

Original datasets herein are sequential, such as a timeseries of timestamped records, that can be divided into subsequences, known herein as windows, of multiple records. Dataset preprocessors herein are window preprocessors that transform an original dataset by dividing the original dataset into windows and processing the windows to generate a transformed dataset. Preprocessor configurations herein specify data partitioning parameters such as various combinations of size and overlap of windows and calculations to apply to window content to generate the transformed dataset.

Because different preprocessor configurations cause different format and content in a transformed dataset, which may determine how effective can be downstream processing of the transformed dataset, one preprocessor configuration may be better than another preprocessor configuration. In other words, a particular preprocessor configuration may cause generation of a transformed dataset that is higher quality, and making configuration adjustments to discover better preprocessor configurations may be important during software development. For example, preprocessor configuration tuning herein discovers a best preprocessor configuration from many alternative preprocessor configurations.

In particular, the present invention relates to machine learning for timeseries data. Herein are preprocessor optimization techniques for machine learning (ML) algorithms that need not be designed for timeseries data. Most ML algorithms cannot accept timeseries data nor learn patterns without some preprocessing. Innovative preprocessing herein involves novel data transformations based on segmenting a timeseries into fixed-sized windows.

Various window sizes capture patterns on different time scales from timeseries data. With specially transformed timeseries data, generic machine learning models that are not designed for timeseries forecasting may nonetheless be used, such as multilayer perceptron (MLP), Bayesian neural network (BNN), K nearest neighbor (KNN), and classification and regression trees (CART).

Techniques herein tune the size and number of windows in a window preprocessor. The window preprocessor divides a timeseries into subsequences that may be more or less small. To generate these subsequences, techniques herein slide a window along the timeseries data. All timestamps and corresponding data points that are located inside the sliding window at a current position belong to a current subsequence. Subsequences can have partial or no overlap with adjacent subsequences, depending on the sliding window's size and motion.

A timeseries or other sequential dataset or individual subsequence, such as when a timeseries is divided into small subsequences, are examples of sequential data. Sequential data may be unsuited as machine learning input because most machine learning algorithms expect so-called point-based data as input. Point-based data is inherently non-sequential such that point-based records in a point-based dataset can be individually inferenced by most machine learning models without context such as a subsequence or an unordered subset of some temporally neighboring records. For example, records in a timeseries may each contain a distinct respective timestamp, and records in a point-based dataset need not contain a timestamp.

Most machine learning models are point-based and accept and inference only one point-based record at a time. Thus, point-based machine learning models are insensitive to aspects, dimensions, or features such as time, relative ordering of multiple records, and temporal adjacency or temporal proximity of records. That is a technical problem if time, ordering, or relations between records such as proximity provide important patterns for detection or classification. As follows, subsequence summarization provides an efficient solution for bridging the gap between timeseries data and powerful point-based machine learning models.

Subsequences can be summarized using statistical aggregation functions, such as mean, variance, etc. These generated aggregate features form a point-based dataset that can be used to fit point-based ML algorithms. Window aggregation statistics, such as mean, act as low pass filters for smoothing. Because different timeseries datasets may have properties on different time scales, it is important to capture information on different frequency scales. In order to achieve such effect without performing in-depth signal analysis, a combination of various window sizes can be included in the timeseries transformation. Shorter window sizes capture higher frequencies, while longer window sizes filter out high frequency components and only capture slower variations in data. Thus, using a combination of window sizes provides more information about the underlying timeseries.

Herein, a goal of tuning a timeseries preprocessor is to maximize the accuracy score of a point-based ML model by varying the preprocessor parameters for a given dataset in an exploratory way. This is achieved by repeatedly: a) adjusting configuration parameters of the window preprocessor, b) converting a timeseries dataset to a point-based dataset using these parameters, c) fitting a point-based ML model on the resulting dataset, and d) evaluating the ML model's performance to obtain a score for the point-based dataset. This loop is repeated until convergence criteria (e.g. loss-tolerance) are met. As explained herein, a general optimizer, a grid search, a gradient descent, or any other optimization or search algorithm can be used to tune the window preprocessor parameters.

With increasing amount of recorded and/or streaming data and much demand for analytics, academic and industrial researchers have focused more on developing an automated machine learning (AutoML) platform. Herein, an AutoML pipeline is designed to find a best ML model and tune the ML model's configurable hyperparameters for a given dataset. However, data preprocessing is a stage of an AutoML pipeline that is insufficiently studied. Data preprocessing is an important phase and can have an immense impact on final results such as ML model accuracy. Unlike other approaches, techniques herein thoroughly parameterize and tune a window preprocessor to convert timeseries datasets into point-based datasets and evaluate a point-based ML algorithm using a sophisticated AutoML optimizer.

The ML platform herein, when given a timeseries dataset, an ML algorithm, and a desired prediction task, reliably produces a trained ML model with high accuracy. Such automation enhances the productivity of data scientists and facilitates faster and wider adoption of machine learning. Moreover, there is a growing need to automatically apply machine learning to timeseries datasets due to increasing use of sensor telemetry and infeasibility of manual high-volume data processing. Solutions herein automate the application of machine learning to timeseries datasets.

Herein is a novel approach of timeseries preprocessing within the context of an AutoML pipeline that uses point-based ML models. In this approach, window preprocessor configuration parameters are thoroughly tuned according to performance evaluation feedback from point-based machine learning. This reduces a need for domain expert knowledge and avoids manual iterative trials. Approaches herein automatically select a best ML model once a timeseries dataset is converted to a point-based dataset and tunes that ML model's configurable hyperparameters for maximum performance and production readiness.

In an embodiment and as follows, a computer generates and evaluates many preprocessor configurations for a window preprocessor that transforms a training timeseries dataset for an ML model. With each preprocessor configuration, the window preprocessor is configured. The window preprocessor converts the training timeseries dataset into a configuration-specific point-based dataset that is based on the preprocessor configuration. The ML model is trained based on the configuration-specific point-based dataset to calculate a score for the preprocessor configuration. Based on the scores of the many preprocessor configurations, an optimal preprocessor configuration is selected for finally configuring the window preprocessor, after which, the window preprocessor can optimally transform a new timeseries dataset such as in an offline or online production environment such as for real-time processing of a live streaming timeseries.

In an embodiment, the window preprocessor partitions the training timeseries dataset into window sequence(s). A timeseries dataset is a sequence of input records, with each record recorded at a distinct respective time, and a window sequence is a partitioning of that sequence into subsequences of records. Each window sequence has a distinct window size of a fixed amount of input records in the training timeseries dataset. Each preprocessor configuration specifies various statistical summary operators to apply to a positioned window of timeseries input records for each window in each window sequence. For each positioned window, the window preprocessor generates a feature vector in the configuration-specific point-based dataset. Each statistical summary operator calculates a respective value in the feature vector.

1.0 Example Computer

FIG. 1 is a block diagram that depicts an example computer 100, in an embodiment. Computer 100 optimally configures a timeseries preprocessor for machine learning algorithms that need not be designed for timeseries data. Computer 100 may be one or more of a rack server such as a blade, a personal computer, a mainframe, a virtual computer, or other computing device.

As shown, computer 100 contains window preprocessor 120 that is an executable software component that, when configured with a preprocessor configuration such as 131 or 132, converts a timeseries dataset such as 111 or 112 into a configuration-specific point-based dataset such as 140. In an embodiment, an operating process of computer 100 executes window preprocessor 120 by executing software composed of processor instructions.

Timeseries dataset 111 contains a temporal sequence of multivalued records (not shown) such as individual lines of text in a console log or telemetry from various sensors such as two thermometers and a voltmeter. Timeseries dataset 111 may contain data that is synchronized at regular intervals, such as a record for each second or each minute, or sporadic data that is recorded at irregular intervals and may or may not be timestamped. In any case, timeseries dataset 111 contains records in an ordering that preserves an original temporal ordering.

1.1 Machine Learning Model

Herein, timeseries dataset 111 or 112 is used as input by window preprocessor 120, in various scenarios that depend on a lifecycle phase and/or a deployment environment as follows. Ultimately, window preprocessor 120 is used in a production environment that may be online or offline as follows. In a live environment in which a timeseries dataset streams in small batches of records or one record at a time such as in real time: a) window preprocessor 120 is already optimally configured; b) machine learning (ML) model 150 is already trained; and c) window preprocessor 120 and ML model 150 may or may not be collocated such as hosted together on same computer 100 as shown. For example, window preprocessor 120 and ML model 150 may share a memory address space and/or an execution process.

Depending on the embodiment, ML model 150 is designed for clustering, classification, regression, anomaly detection, prediction, or dimensionality reduction (i.e. simplification). Example machine learning algorithms for ML model 150 include decision trees, support vector machines (SVM), Bayesian networks, stochastic algorithms such as genetic algorithms (GA), and connectionist topologies such as artificial neural networks (ANN). Implementations of machine learning may rely on numeric matrices, symbolic models, or hierarchical and/or associative data structures.

Hyperparameterized (i.e. configurable) implementations of best of breed machine learning algorithms may be found in open source libraries such as scikit-learn (sklearn), Google's TensorFlow for Python and C++, or Georgia Institute of Technology's MLPack for C++. Shogun is an open source C++ ML library with adapters for several programing languages including C#, Ruby, Lua, Java, MatLab, R, and Python.

The lifecycle of ML model 150 has two phases. The first phase is preparatory and entails training, such as in a laboratory with a training corpus of historic data that may be retrieved from an archive. The second phase entails inferencing in a production environment, such as online with live and/or streaming data or offline with accumulated data that awaits scheduled processing such as hourly, nightly, weekly, or monthly.

1.2 Window Preprocessor

The lifecycle of window preprocessor 120 also has two phases that are contemporaneous to the two phases of ML model 150. The first phase for window preprocessor 120 is preparatory and entails configuration tuning, such as in the laboratory with the training corpus. The second phase entails timeseries preprocessing in the production environment, such as online with the live and/or streaming data or offline with the accumulated data that awaits scheduled processing.

Inferencing entails recognition of semantic patterns in multivariate data, which is difficult but manageable if a semantic pattern to be recognized is entirely encapsulated within a single record such that each record may be individually analyzed for an individual inference. Inferencing with timeseries data presents special technical hurdles because time is not merely an additional dimension. With timeseries data, a semantic pattern may involve not a single record but instead a subsequence of multiple records such that the semantic pattern is unrecognizable when only one record is analyzed by itself.

Furthermore, the precise ordering of the multiple records in the subsequence may provide context that is part of the semantic pattern such that reordering of records makes the semantic pattern unrecognizable. Furthermore, the extent and alignment of the subsequence may be important to pattern recognition. For example, dividing timeseries data 111 into five-record subsequences makes recognizing a six-record pattern impossible. Likewise with such five-record divisions, such as placing records 1-5 (not shown) in a first subsequence and placing records 6-10 in a second subsequence, a five-record pattern may still be unrecognizable if the pattern spans records 3-7 that does not entirely occur in either subsequence.

Thus, sequence inferencing is technically difficult in ways that, with other approaches, is only accommodated by special kinds of ML algorithms such as a recurrent neural network and/or with special kinds of ML components such as long short term memory (LSTM). In other words, most ML architectures cannot infer a sequential pattern. Whereas techniques herein work with any kind of ML model and even work with opaque ML models that have undisclosed internal architectures. Thus, techniques herein are generally applicable to machine learning for timeseries data in a model-agnostic way as follows.

1.3 Sliding Window

Window preprocessor 120 superimposes a fixed-size sliding window (not shown) on input timeseries data 111 that contains a fixed amount of input records. As the window slides in a fixed-size increment of one or more records at a time: a) oldest record(s) in the window slide out of the window and cease to influence operation of window preprocessor 120; b) some records remain in the window; c) unprocessed record(s) enter the window; and d) the sliding process repeats itself until the window has iteratively passed over and processed all records in timeseries data 111.

The purpose of window preprocessor 120 is to convert a timeseries dataset into a nonsequential so-called point-based dataset shown as configuration-specific point-based dataset 140 that contains records that, as suggested above, can be individually inferenced by any ML model and without context such as a subsequence nor even an unordered subset of some neighboring records. In one example, ML model 150 is a point-based model that accepts and inferences only one point-based record of configuration-specific point-based dataset 140 at a time.

Although sizing and sliding metrics for window preprocessor 120 are discussed later herein, those metrics may be configured such that configuration-specific point-based dataset 140 may have fewer or more records than timeseries dataset 111. In other words, usually there is not a one-to-one correspondence of input records to output records. Although various kinds of output datasets are discussed later herein, including some that are timeseries instead of point-based, configuration-specific point-based dataset 140 has one point-based output record for each position that the sliding window arrives at to capture one window of input records. For example if the sliding window need only slide from a first position to a second position to process all input records of timeseries dataset 111, then only two output records are generated for configuration-specific point-based dataset 140. For example if: a) timeseries dataset 111 contains a hundred input records, b) the window size is fifty records, and c) the window slides fifty records at a time, then d) only two output records are generated for configuration-specific point-based dataset 140.

1.4 Point-Based Output Records

Unlike timeseries dataset 111, configuration-specific point-based dataset 140 may be unordered or otherwise reorder records such that the sequential ordering of records in timeseries dataset 111 need not be preserved in configuration-specific point-based dataset 140. For example for horizontal scaling, such as inelastic multicore symmetric multiprocessing (SMP) or elastic cloud processing, multiple replicas of ML model 150 may each simultaneously and repeatedly inference with a next respective individual record of configuration-specific point-based dataset 140. Such task parallelism may be unsynchronized to maximize throughput such that some processors may race ahead and inference more records than other processors such that inferential global ordering is somewhat arbitrary. Despite such unordered inferencing, sequential pattern recognition remains possible, although counterintuitive, with techniques presented herein.

However because output record ordering can be preserved if needed, techniques herein can be used even if ML model 150 requires sequential data such as with a recurrent neural network. In that case it may seem that window preprocessor 120 cannot add value but, again counterintuitively, techniques herein provide data enrichment based on multi-record window statistics that may reveal a temporal trend in a way that any ML model, sequential or not, can be trained to recognize. By providing multiple window sizes, trends of different temporal frequencies can be revealed, thus making it possible to detect a trend of a previously unknown frequency.

For example, timeseries dataset 111, in its entirety or in part, may or may not be embedded within a sequential configuration-specific output dataset (not shown) if an ML model such as a recurrent neural network needs timeseries data. In any case and in these ways, window preprocessor 120 can facilitate operation of sequential and nonsequential ML models when inferencing directly from raw timeseries dataset 111 would be less accurate or infeasible. For example, the diversity of recognizable semantic patterns and/or the complexity of raw timeseries data may be increased without loss of accuracy with techniques herein.

The point-based dataset generated by window preprocessor 120 is known herein as a configuration-specific dataset because the contents of each record in that dataset depends on how window preprocessor 120 is configured. That is, window preprocessor 120 may process same timeseries dataset 111 twice with different respective preprocessor configurations 131-132 to generate different configuration-specific datasets. The many ways in which preprocessor configurations 131-132 may be different are discussed later herein.

In any case, different preprocessor configurations 131-132 cause ML model 150 to have different performance characteristics. For example, preprocessor configuration 131 may affect the operation and/or result of ML model 150 such as model accuracy and/or resource consumption such as inferencing and/or training time and/or memory space. Any combination of those performance metrics may be used to score the suitability of a particular preprocessor configuration when used with a particular timeseries dataset. In this example embodiment, score 160 for preprocessor configuration 131 is calculated solely based on an inference quality metric such as accuracy or error.

For example, timeseries dataset 111 can be reused to train, validate, and test ML model 150 separately with each of preprocessor configurations 131-132, after which a separate score may be calculated for each of preprocessor configurations 131-132. In that way, it may be discovered which of preprocessor configurations 131-132 is better for processing timeseries dataset 111. When many different preprocessor configurations are scored, such as hundreds or thousands, it may be possible to discover a more or less optimal preprocessor configuration. This discovery process is known herein as configuration tuning.

Combinatorics of such configuration tuning may be beyond the capacity of manual operation such that sophisticated automation such as a machine learning pipeline (not shown) may be needed. An ML pipeline provides exploration automation and workflow orchestration that can optimize many architectural concerns in a pushbutton way including:

discovery of optimal tuning of window preprocessor 120;
discovery of optimal hyperparameter configuration of ML model 150;
feature selection; and
ML model selection.

With regards to the above enumerated degrees of freedom to be explored, hyperparameters (not shown) are adjustable configuration parameters of ML model 150 that are algorithm specific such as how many layers should an artificial neural network have. Feature selection is a static form of dimensionality reduction such that some fields of all records in timeseries dataset 111 are suppressed and not propagated into configuration-specific point-based dataset 140 so that ML model 150 is not distracted with irrelevant features. ML model selection acknowledges that it may be difficult or impossible to predict which ML algorithm would perform best for timeseries datasets 111-112 such that different ML algorithms such as a neural network, a Bayesian network, a support vector machine, and other ML algorithms should be trialed.

2.0 Configuration Tuning

Figure 2:
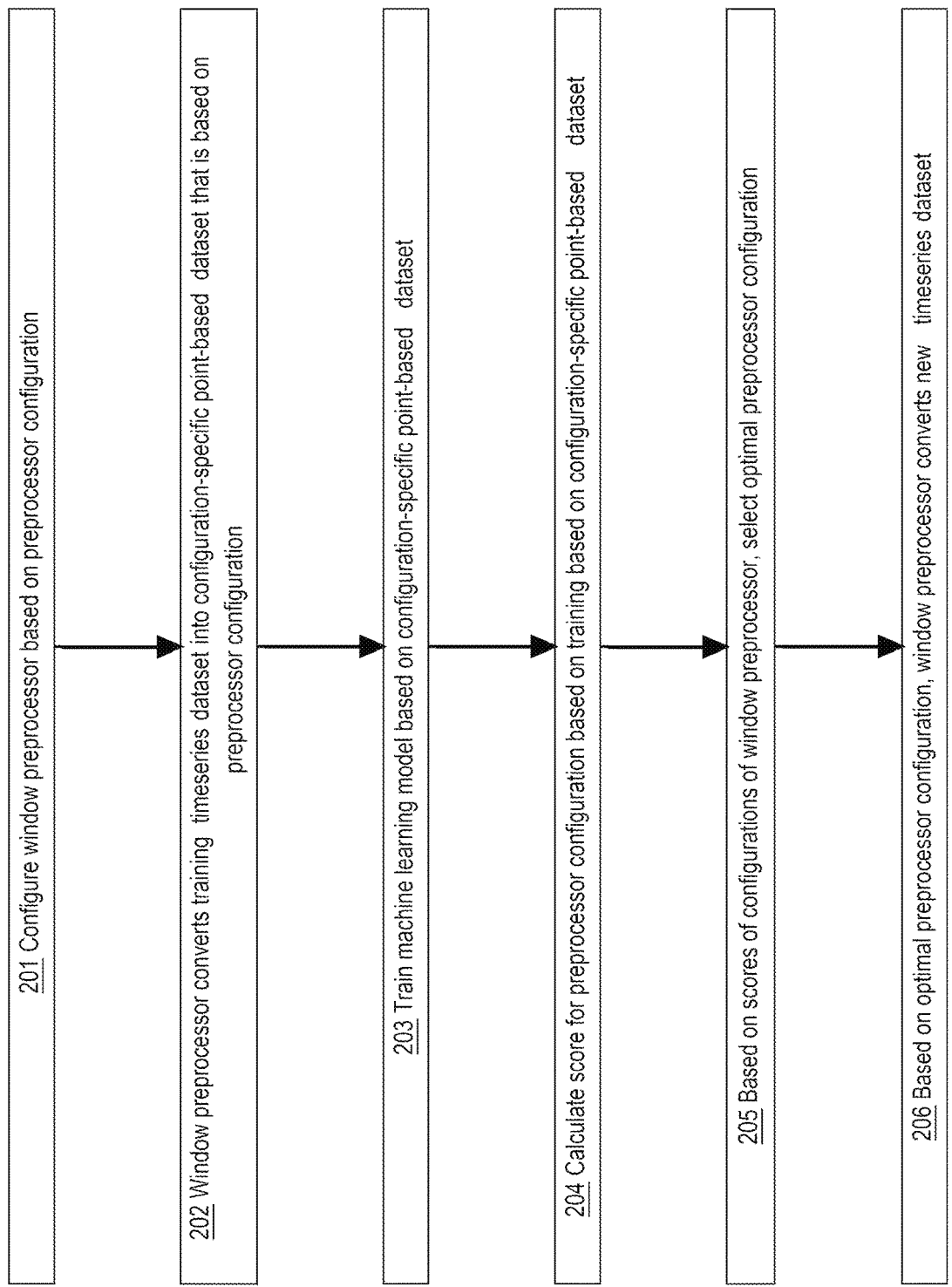
FIG. 2 is a flow diagram that depicts an example computer process that optimally configures a timeseries preprocessor for machine learning (ML) algorithms that need not be designed for timeseries data.

FIG. 2 is a flow diagram that depicts an example process that computer 100 performs to optimally configure window preprocessor 120 for machine learning algorithms that need not be designed for timeseries data. FIG. 2 is discussed with reference to FIG. 1.

Configuration tuning for window preprocessor 120 entails steps 201-205. During such tuning, exploratory steps 201-204 repeat for each of preprocessor configurations 131-132 using same timeseries dataset 111. Step 201 configures window preprocessor 120 based on preprocessor configuration 131.

For example, preprocessor configuration 131 may be newly generated in an exploratory fashion, and suitability of preprocessor configuration 131 may be more or less unknown as discussed later herein. Preprocessor configuration 131 may differ from other preprocessor configurations of window preprocessor 120 according to a distinct combination of configuration parameter values. For example as discussed later herein, each record in timeseries dataset 111 may contain respective values for a same set of fields known herein as original features such as metrics such as temperature and categories such as equipment type.

From those original features may be derived an order of magnitude more statistical features such as averages, extremes, modes, and frequencies as calculated by statistical summary operators. Together the original and derived features may provide more data than ML model 150 needs. For example although more features usually makes ML model 150 more accurate, feature overload could confuse ML model 150 such that diminishing returns eventually cause various detriments to window preprocessor 120 and/or ML model 150 such as reduced inferencing accuracy, increased memory consumption, and increased training latency. Thus as discussed later herein, preprocessor configurations 131-132 differ as to how many and which particular derived features to include, such as generated statistical features.

In step 202, window preprocessor 120 converts timeseries dataset 111 into point-based data shown as configuration-specific point-based dataset 140 that is based on preprocessor configuration 131. Such conversion activity depends on which derived features are specified by preprocessor configuration 131 as discussed later herein. Although configuration-specific point-based dataset 140 is neither temporal nor sequential, step 202 may be inherently sequential due to the sliding behavior of window preprocessor 120. Thus in an embodiment, step 202 should iteratively process input records from timeseries dataset 111 and generate output records into configuration-specific point-based dataset 140 one by one.

Step 203 trains ML model 150 based on configuration-specific point-based dataset 140. As explained earlier herein, efficacy of preprocessor configuration 131 cannot be precisely known without empirical observation of actual exercise of window preprocessor 120 and ML model 150. Also as explained earlier herein, records in configuration-specific point-based dataset 140 may be processed in any ordering, including concurrently such as with task parallelism and in batches.

Thus even though known training approaches based on timeseries dataset 111 are very slow such as with a recurrent neural network that needs sequential ordering to be globally preserved, which prevents parallelism, step 203 provides innovative training based on timeseries dataset 111 that is an order of magnitude faster due to accommodating parallelism. That innovative acceleration provides time for repeated training with many different preprocessor configurations 131-132 which facilitates more intensive exploration of the multidimensional space of possible preprocessor configurations. Such increased exploration in a same amount of time means better preprocessor configurations may be discovered and increases the probability that a theoretically optimal preprocessor configuration is discovered.

Step 204 calculates score 160 for preprocessor configuration 131 based on the training by step 203 that is based on configuration-specific point-based dataset 140. For example, step 204 may calculate loss or accuracy of the training such as during a testing phase at the end of training step 203. For example, loss may be a mean squared error of individual respective measured error for each inference by ML model 150 during testing. Measuring raw error may be straightforward with supervised training or, with unsupervised training, may entail various additional lossy processing such as input reconstruction such as when ML model 150 is or contains an autoencoder as discussed later herein.

Score 160 may or may not be a uniform score such as unit normalized, zero meaned, and/or statistically normalized such as in standard deviations. In any case, respective scores of preprocessor configurations 131-132 can be directly compared to each other to detect which of preprocessor configurations 131-132 facilitates ML model 150 achieving higher accuracy or lower loss. In other words because scores are readily compared, computer 100 can detect which of preprocessor configurations 131-132 is better, which facilitates various important exploratory or optimization behaviors as discussed below and later herein.

Based on scores of many configurations of window preprocessor 120, step 205 selects an optimal preprocessor configuration. As discussed later herein, additional preprocessor configurations may be used for training and scoring until some termination criterion such as a convergence criterion is eventually satisfied, which causes step 205. In various embodiments, step 205 may occur after a fixed temporal period, a fixed amount of preprocessor configurations or, especially with greedy tuning such as hill climbing, when score improvement falls below a threshold. In any case, step 205 picks the best evaluated preprocessor configuration, which is more or less optimal. An embodiment may track a best preprocessor configuration so far throughout exploration on an ongoing basis such that all comparing of scores has already occurred when exploration ceases.

As explained above, step 204 establishes which preprocessor configuration is best, and exploration of the multidimensional space of possible preprocessor configurations ceases. In other words after step 204, window preprocessor 120 is already tuned and ready for the following various uses that may, but need not, involve (e.g. further) use of an ML pipeline. For example, any or all of the steps shown in FIG. 2 may or may not occur in an ML pipeline.

In the following various scenarios based on the optimal preprocessor configuration, window preprocessor 120 converts new timeseries dataset 112 into a point-based dataset in step 206. In one scenario not shown and not involving ML model 150, already-tuned window preprocessor 120 is used to convert timeseries dataset(s) into point-based dataset(s) that are archived for later use. In another scenario and as discussed later herein, already-tuned window preprocessor 120 is used to convert timeseries dataset(s) into point-based dataset(s) that are used for thorough tuning and/or training of ML model 150 for the following reasons.

For example, training during earlier step 203 may occur solely for exploration of the multidimensional space of possible preprocessor configurations and not for actually readying ML model 150 for production use. For example as explained earlier herein, ML model 150 itself has configurable hyperparameters that are extremely resource intensive to tune such that during exploratory step 203, ML model 150 may itself not be tuned and instead ML model 150 is configured only with a default hyperparameters configuration that is satisfactory but not optimal. Even if ML model 150's hyperparameter configuration were already tuned, step 203 may entail abbreviated training of ML model 150 such as with accelerated ML model training convergence criteria such as a small fixed amount of time or an increased learning rate or an abridged training dataset such as when timeseries dataset 111 is small.

Thus, timeseries dataset 111 may be used to tune window preprocessor 120 in earlier steps and, in step 206, already-configured window preprocessor 120 may convert timeseries dataset 112, which may or may not be larger than timeseries dataset 111, for thorough tuning and/or training. In another scenario, conversion of timeseries dataset 111 or 112 may be further needed to train other ML models such as when it is unclear whether ML model 150 is or is not a best ML model for production use as discussed later herein.

In another scenario, timeseries dataset 111 is for tuning and training, and timeseries dataset 112 instead is used during production use. For example, timeseries dataset 112 may or may not be live streaming data that ML model 150 analyzes. In another scenario, production trends or environmental trends such as data drift or concept drift cause a previous best preprocessor configuration to become outdated such that window preprocessor 120 eventually needs retuning with more recent data such as new timeseries dataset 112 to discover a new best preprocessor configuration for the new data regime.

In any case, timeseries datasets 111-112 demonstrate that window preprocessor 120 may use one timeseries dataset for tuning and another timeseries dataset in production or for later retuning. For example as discussed later herein, an ML pipeline may make retuning of window preprocessor 120 straightforward. In other words and in those various scenarios, window preprocessor 120 and/or its best preprocessor configuration are reusable. For example, resource costs for tuning window preprocessor 120 may be amortized over a long term of production service with many timeseries datasets such that retuning never or infrequently is needed.

3.0 Multiple Window Sequences for Same Configuration

Figure 3:
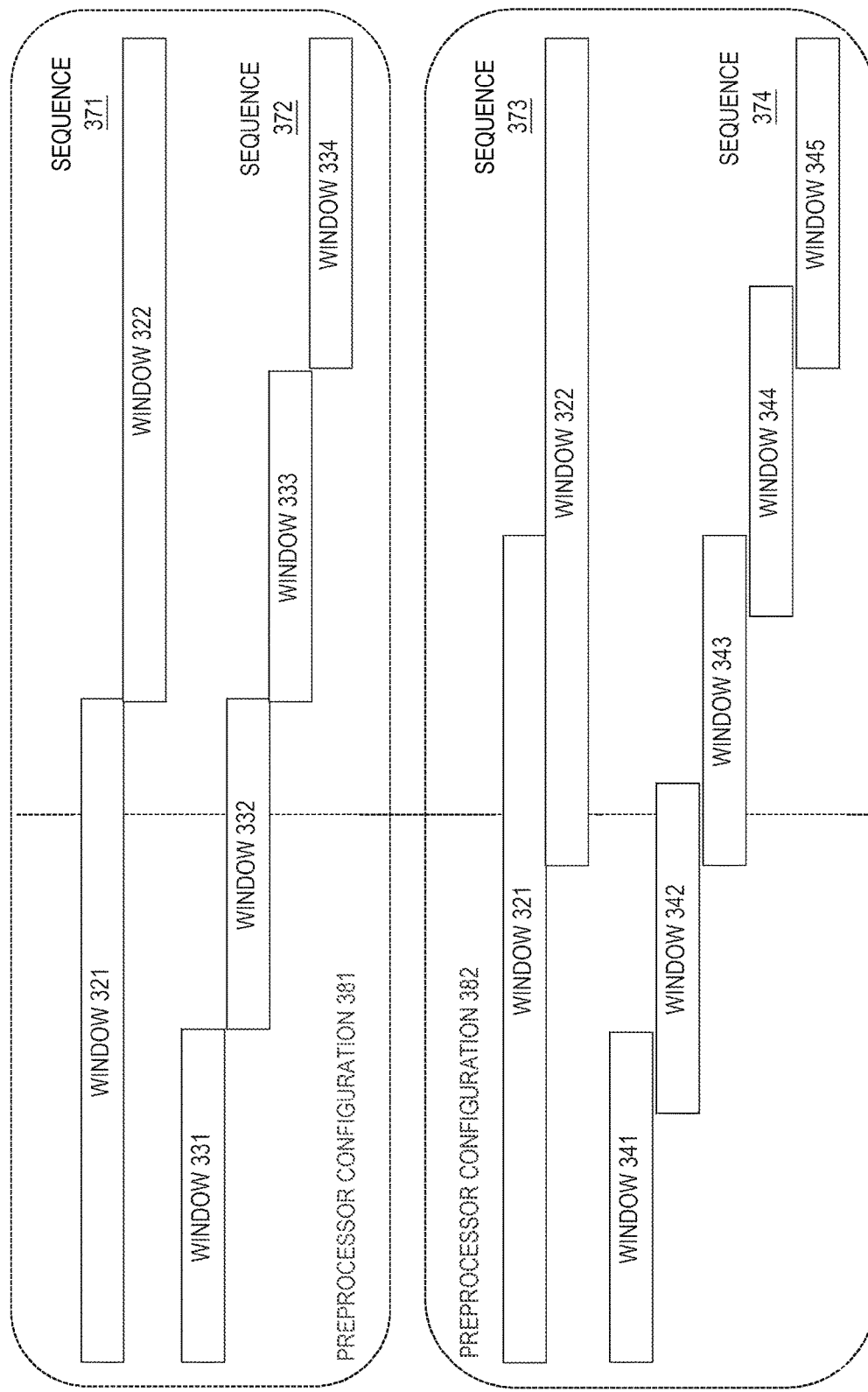
FIG. 3 is a block diagram that depicts an example computer that uses multiple window sequences to generate one configuration-specific point-based dataset.

FIGS. 3-4 are different depictions of same computer 300 that demonstrate various aspects of multiple window sequences for a same preprocessor configuration. FIG. 3 emphasizes input timeseries dataset 310. FIG. 4 emphasizes output configuration-specific point-based dataset 400.

FIG. 3 is a block diagram that depicts an example computer 300, in an embodiment. Computer 300 uses multiple window sequences to generate one configuration-specific point-based dataset. Computer 300 may be an implementation of computer 100.

As explained earlier herein, a window preprocessor (not shown) has a fixed size window that slides along a timeseries dataset such as 310. Also as explained earlier herein, the window preprocessor may use multiple window sizes to capture trends of different temporal frequencies. That is, a same preprocessor configuration such as 381 or 382 may specify multiple window sizes to be simultaneously used when generating a configuration-specific point-based dataset (not shown) such as follows.

3.1 Stride

In an embodiment described earlier herein, a sliding window moves by one record at a time such that an oldest record leaves the window, some records remain in the window, and a new record enters the window. Herein such sliding entails a stride of one, which means that the window slides/advances by one record. As follows, the preprocessor configuration may specify multiple strides, including strides greater than one, and multiple window sizes.

That is, the preprocessor configuration specifies multiple distinct window sequences such that each window sequence has a distinct combination of stride and size. If the multiple distinct window sequences all have a same size, then they all have different strides. Conversely, if the multiple distinct window sequences all have a same stride, then they all have different sizes. Likewise, some or none of multiple distinct window sequences may have a same size and some other or none of those multiple distinct window sequences may have a same stride. For example, each of multiple distinct window sequences may have a different size and a different stride.

As explained above, stride is how many records does a sliding window move in a single incremental advancement such that the sliding window occupies a different position in timeseries dataset 310 at each advancement. In other words, the sliding window divides timeseries dataset 310 into partitions, where each partition is a positioned window, such that a sliding window may generate a sequence of distinctly positioned windows such as windows 341-345 of sequence 374 as shown, where preprocessor configuration 382 specifies multiple distinct sequences 373-374 as distinct combinations of stride and window size.

When stride is smaller than the window size, the sequence contains overlapping windows as shown in sequences 373-374 such that the size of the overlap is the arithmetic difference of the window size minus the stride. When stride is the same as the window size, windows are contiguous without overlap as shown in sequences 371-372. Although not shown, stride may be greater than the window size, in which case there are gaps between windows in a same sequence such that some records are skipped such that the window sequence and generated output dataset are not based on all of the records of timeseries dataset 310, which is an example of sampling. For example, a same preprocessor configuration may specify a sequence with overlap, a sequence with gaps, and a sequence with neither overlap nor gaps.

3.2 Point-Based Embodiment

As discussed earlier herein, there are two mutually exclusive approaches to dataset conversions herein. Both approaches configure a sliding window preprocessor with a preprocessor configuration that has multiple distinct combinations of stride and window size. Both approaches apply the sliding window preprocessor to an input timeseries dataset. The approaches differ in what kind of output dataset (not shown in FIG. 3) does the window preprocessor generate.

In the approach shown in FIG. 1, a window preprocessor generates a point-based output dataset that contains one output record per positioned window such that the output record contains summary statistics based on multiple input records in the positioned window.

As shown in FIG. 3, timeseries dataset 310 contains records 351-366. Same record 357 occurs in positioned windows 321 and 332 for same preprocessor configuration 381 as shown by the dashed vertical line. Such repeated use of a same record in different statistical contexts (i.e. positioned windows) facilitates detecting a trend of an unknown frequency and/or any of multiple trends of multiple respective frequencies as explained earlier herein.

Also as explained earlier herein, there is not a one-to-one correspondence between input and output records but instead a one-to-one correspondence between point-based output records and positioned windows in a window sequence. For example for sequence 372 of preprocessor configuration 381, a respective output record may be generated for each of four windows 331-334. Likewise for sequence 371 of same preprocessor configuration 381, a respective output record may be generated for each of two windows 321-322.

Thus, different window sequences in a same preprocessor configuration may generate different respective amounts of output records for a same input timeseries dataset. For example in an embodiment, the window preprocessor may make a single sequential pass over timeseries dataset 310 during which multiple sliding windows, with one window per sequence of multiple sequences such as 371-372 of same preprocessor configuration 381, may be simultaneously positioned and superimposed on timeseries dataset 310 such as in ways discussed later herein.

3.3 Base and Multiplier

In an embodiment, a whole subsequence of smaller windows should precisely fit in a larger window of a different sequence for a same preprocessor configuration. For example, windows 331-332 of sequence 372 precisely fit in window 321 of sequence 371. For example, a window configuration may specify: a smallest window size as a base size, a size multiplier for calculating other window sizes, and an amount of window sizes. For example, preprocessor configuration 381 has a base size of four input records per positioned window, a multiplier of two that means that window 321 should be twice the size of window 331, and two as an amount of sizes, which means that preprocessor configuration 381 has two sequences 371-372.

In preprocessor configuration 381, sequence 371 has a window and a stride of a same size. Likewise, sequence 372 has a window and a stride of a same size. Whereas preprocessor configuration 382 specifies sizes of strides and windows without a multiplier. For example, sequence 374 has a stride of three and a window size of four, but sequence 373 has a stride of six and a window size of ten.

3.4 Nested Sliding

Although preprocessor configurations 381-382 have different strategies for specifying sizes of strides and windows, preprocessor configurations 381-382 share a common aspect such that multiple positioned windows of one sequence precisely fit in one window of another sequence. For example due to a stride being smaller than a window in sequence 374, three positioned windows 341-343 precisely fit in window 321 even though the size of window 321 is not triple the size of 341. Such precise nesting of multiple smaller windows within a bigger window facilitates efficient processing of timeseries dataset 310 in a single pass as follows.

In the single pass, the window preprocessor positions the sliding window of the window sequence having the largest window size, such as window 321 in sequence 371 with preprocessor configuration 381. While window 321 is being processed, the window preprocessor may recursively repeat that positioning activity to process smaller window 331 in other sequence 372 by recursively using window 321 as if window 321 were a whole input timeseries dataset similar to timeseries dataset 310.

Thus while the sliding window of sequence 371 is stationary to process window 321, the sliding window of other sequence 372 may slide and sequentially process windows 331-332. In other words, the window preprocessor has multiple sliding windows of different sizes, with one sliding window per sequence of multiple sequences 371-372, and the multiple sliding windows slide at different frequencies such that the sliding window of sequence 372 is repositioned three times as often as the sliding window of sequence 371. Despite different repositioning frequencies, both sliding windows generally progress through timeseries dataset 310 at a same pace such that: a) the bigger sliding window always contains the smaller sliding window, and b) both sliding windows finish processing timeseries dataset 310 at a same time.

Although such nested sliding is discussed above with only two sequences 371-372, nested sliding may be recursively extended for any amount of sequences of a same preprocessor configuration. Likewise, nested sliding may occur when either or both of sequences 373-374 have overlapping windows due to a stride that is less than the window size. Likewise, nested sliding may occur when the sequence with smaller windows has gaps due to a stride that is more than the window size.

Such variations are supported so long as nesting fits a whole smaller window in a bigger window such as follows. Window 343 precisely fits within each of windows 321-322 individually, but window 343 should not be processed twice. Likewise, window 342 entirely fits in window 321 but only partially fits in window 322 such that window 342 should only be processed while processing window 321.

As discussed above, an embodiment of nested sliding relies on precise alignment of bigger and smaller windows. In an embodiment not shown, the window preprocessor may still need only a single pass even though there is no alignment between bigger and smaller windows. For example, a smaller window may straddle a boundary between two bigger windows such that neither bigger window entirely contains the smaller window. In that case, the window preprocessor should retain two adjacent bigger windows in a sequence for straddled processing in other sequence(s). Thus, somewhat more complicated unaligned processing does not require multiple passes over timeseries dataset 310.

4.0 Uniformity Despite Multiple Window Sizes

FIG. 4 is a block diagram that depicts same example computer 300 of FIG. 3, in an embodiment. Computer 300 uses multiple windowing sequences to generate configuration-specific point-based dataset 400. FIG. 4 is presented with reference to FIG. 3.

Configuration-specific point-based dataset 400 is generated from timeseries dataset 310 by the window preprocessor according to preprocessor configuration 382 that specifies window sequences 373-374. Specifically, FIG. 4 shows nested processing of windows 321 and 341-343.

Configuration-specific point-based dataset 400 is shown as a table with a window column, a maximum (max) column, and an average (avg) column. Only numbers shown in bold in the max and avg columns are actually stored in configuration-specific point-based dataset 400. The window column is demonstrative and not stored.

For demonstration, each horizontal arrow shows that each row of configuration-specific point-based dataset 400 is generated from a respective positioned window. Although windows 321 and 341 have different sizes and contain different amounts of input records, each row of configuration-specific point-based dataset 400 has a same size. That is because, as discussed later herein: a) preprocessor configuration 382 specifies a set of distinct statistical summary operations that are applied to all windows of all sequences 373-374, and b) each statistical summary operation is window-agnostic such that the statistical summary operation can be applied to any window of any size having any amount of input records without altering the semantics of the statistical summary operation.

For example, a maximum or an average is calculated according to a same respective formula regardless of whether applied to one input record or a hundred records. Thus, data in the max column or the avg column are uniformly calculated and uniformly meaningful even though derived from windows of different sizes. Thus even though the window preprocessor should more or less strictly know that window 341 is nested in window 321 and that window 341 occurs before window 342, an ML model that receives configuration-specific point-based dataset 400 need not know that the rows of configuration-specific point-based dataset 400 are interrelated in any way.

Such relaxation of correlation constraints facilitates novel improvements discussed earlier herein such as: a) enabling an ML model that is not designed for sequential inferencing to nonetheless make inferences for timeseries dataset 310, and b) enabling an ML model to process rows of configuration-specific point-based dataset 400 without preserving a global ordering. For example, adaptive sampling may be applied for acceleration such that some rows of configuration-specific point-based dataset 400 are skipped during inferencing. Likewise as explained earlier herein, reordering or unordering enables task parallelism with replicas of the ML model for acceleration by elastic or inelastic horizontal scaling including intended and unintended phenomena that may incidentally cause reordering such as work stealing and/or unsynchronized racing ahead.

4.1 Exotic Applications Become Point-Based

Because point-based generation techniques herein enable an ML model that is not designed for temporal inferencing to nonetheless make inferences for timeseries data, powerful point-based ML models are newly available to important temporal analysis applications. For example, a window preprocessor may generate a point-based dataset from a timeseries dataset such as offline or online quote data from an exchange such as a ticker tape or other real-time live quote feed of bids and asks. For example, techniques herein may be used during ML model validation and testing such as with an ML pipeline as discussed later herein such as for backtesting a predictive point-based ML model, although not designed for timeseries data, with a historical timeseries such as for price forecasting.

Furthermore and because point-based generation techniques herein enable an ML model that is not designed for sequential inferencing to nonetheless make inferences for sequential data, powerful point-based ML models are newly available to important sequential analysis applications. For example, techniques herein are equally applicable to temporal and nontemporal sequential data. For example, nontemporal sequential analysis applications include bioinformatics and material surface analysis. For example, a window preprocessor may generate a point-based dataset from a sequential dataset such as: a) a single sequence of nucleic acids or amino acids, or b) path geometry such as from a linearly scanned surface such as during three-dimensional surface acquisition such as for material defect detection.

4.2 Window Preprocessing Workflow

In any case, shown legend 410 is not part of shown computer 300. Legend 410 is shown for demonstration to informally depict an overview of window preprocessing workflow. On the left of legend 410 are a timeseries and partially overlapping positioned windows labeled as "windows" that occur in a same window sequence of a preprocessor configuration (not shown).

However, the preprocessor configuration has three window sequences that are shown as three columns of timeseries fragments in the middle of legend 410, with each fragment being a positioned window. The three window sequences have different respective window sizes because the three columns have different widths as shown. As shown, the smallest window size has the most fragments. Also as shown, the other two window sequences have different widths but a same amount of fragments, which is only possible if the smaller window size has the greater stride.

The window preprocessor generates a configuration-specific point-based dataset, shown as rows and columns in a table that is labeled "generated features", with each row being a generated output record and each column storing summary statistic values such as max and avg as shown in configuration-specific point-based dataset 400.

5.0 Multivariate Input

FIG. 5 is a block diagram that depicts an example computer 500, in an embodiment. Computer 500 explores a multidimensional problem space that is based on a multivariate timeseries dataset and a multidimensional preprocessor configuration space. Computer 500 may be an implementation of computer 100.

Techniques presented earlier herein may or may not assume that input timeseries data has only two dimensions with time as an independent variable as one dimension, and a dependent variable such as temperature as a second dimension such that time may or may not be implied by sequential ordering of input records such that an individual input record may contain only a single value, which is for temperature. In other words, input records may be one-dimensional for demonstration, which may or may not be practical. However, techniques herein are readily applicable to multivariate input records as follows.

For example, each input record may contain respective values for same original features 510 as shown. For example, each input record may be a line item of a purchase order such as with a cash register receipt at a point of sale/service (POS) such as stored in an online transactional processing (OLTP) database. Some of original features 510 are floating point numbers such as price and tax. Some of original features 510 are integers such as quantity, and some are categorical such as color and style.

Such different datatypes may limit which of the shown statistical summary operators can be applied to which original features based on which datatype is expected for an argument of the statistical summary operator. For example, average (avg), maximum (max) and standard deviation (stddev) are statistical summary operators that only accept numeric arguments. Whereas, number of distinct values (NDV) is a statistical summary operator that accepts any argument. Count is a statistical summary operator that accepts a predicate as an argument as discussed later herein.

Herein, an operation is a combination that applies a particular statistical summary operator to a particular original feature. For example, preprocessor configuration 521 specifies various operations including avg(price) where avg is the statistical summary operator and price is the original feature. Each such operation calculates a value from a positioned window of multiple input records and stores the value in a respective feature of derived features 531 in an output record for the window in an output (e.g. point-based) dataset (not shown) that is based on preprocessor configuration 521.

As explained above, each output feature is based on a respective operation that is a combination that applies a particular statistical summary operator to a particular original feature. Original features 510 may have hundreds or thousands of features, and there may be many available statistical summary operators such that the combinatorics of possible operations may be immense and made more so as follows.

Different preprocessor configurations may specify different amounts of operations such that derived features 531-532 have different amounts of features as shown. In an embodiment, count is a statistical summary operator whose predicate argument tests one original feature for one value such as a categorical value such as color=red as shown, which adds category values as additional degrees of freedom for combinatorics. Likewise, different preprocessor configurations may specify different amounts of window sequences with different combinations of stride and window size, which further expands the combinatorial space by an order of magnitude.

Instances for such combinations such as derived features 531-532 can be automatically generated by exhaustive elaboration or sampled for accelerated exploration such as according to various strategies including randomization and/or grid intervals. A sophisticated way to optimally explore the combinatoric space is greedy hill climbing according to gradient(s) so long as preprocessor configurations can be scored while climbing to calculate gradient. These various ways of automatically exploring the combinatoric space may or may not be provided by an ML pipeline as discussed earlier herein. In any case, exploration may generate and/or score hundreds or thousands of preprocessor configurations. For example, task parallelism may accelerate by concurrently scoring multiple individual or batches of preprocessor configurations, which may or may not be provided by an ML pipeline.

When exploration generates preprocessor configurations that specify different amounts of derived features, a uniform amount of features may be achieved as follows. Each derived feature is numeric, and a preprocessor configuration's set of derived features may be extended with zero-valued dummy derived features as needed to make the set of derived features as wide as that of other preprocessor configurations. For example, an embodiment may limit each preprocessor configuration to at most forty derived features and pad with dummy features when needed. In that way, an ML model already configured with hyperparameters may accept a point-based record that was generated by either preprocessor configuration 521 or 522 because a uniform feature vector width is provided. In other words, the ML model can be reused, without being reconfigured, to score both preprocessor configurations 521-522.

As shown, preprocessor configurations 521-522 demonstrate various example variations as follows:

Different preprocessor configurations may have same or different amounts of derived features;

Different preprocessor configurations may have a same operation such as avg(price) as shown;

One preprocessor configuration may have an operation that another preprocessor lacks such as max(price) as shown;

One preprocessor configuration may have a statistical summary operator that another preprocessor lacks such as ndv as shown;

A same preprocessor configuration may have a same statistical summary operator with different arguments such as ndv(color) and ndv(style) as shown;

Different preprocessor configurations may have a same statistical summary operator with different arguments such as stddev(price) and stddev(quantity) as shown;

A same preprocessor configuration may have different statistical summary operators with a same argument such as max(price) and avg(price) as shown;

Different preprocessor configurations may have different statistical summary operators with a same argument such as max(price) and stddev(price) as shown;

One preprocessor configuration may use an original feature that another preprocessor configuration does not such as style as shown;

Different preprocessor configurations may use different amounts of original features. For example, derived features 531-532 respectively use three and two original features as shown;

A same preprocessor configuration may use one original feature more often than another original feature. For example, derived features 532 uses price and quantity respectively twice and once as shown;

Different preprocessor configurations may use different amounts of distinct statistical summary operators. For example, derived features 531-532 respectively use four and three distinct statistical summary operators as shown.

As shown, original features 510 may contain a temporal indicator such as a time, a date, and/or a timestamp. In the shown embodiment, the timestamp in original features 510 is absent in some or all of derived features 531-532.

6.0 Automated Tuning

Figure 6:
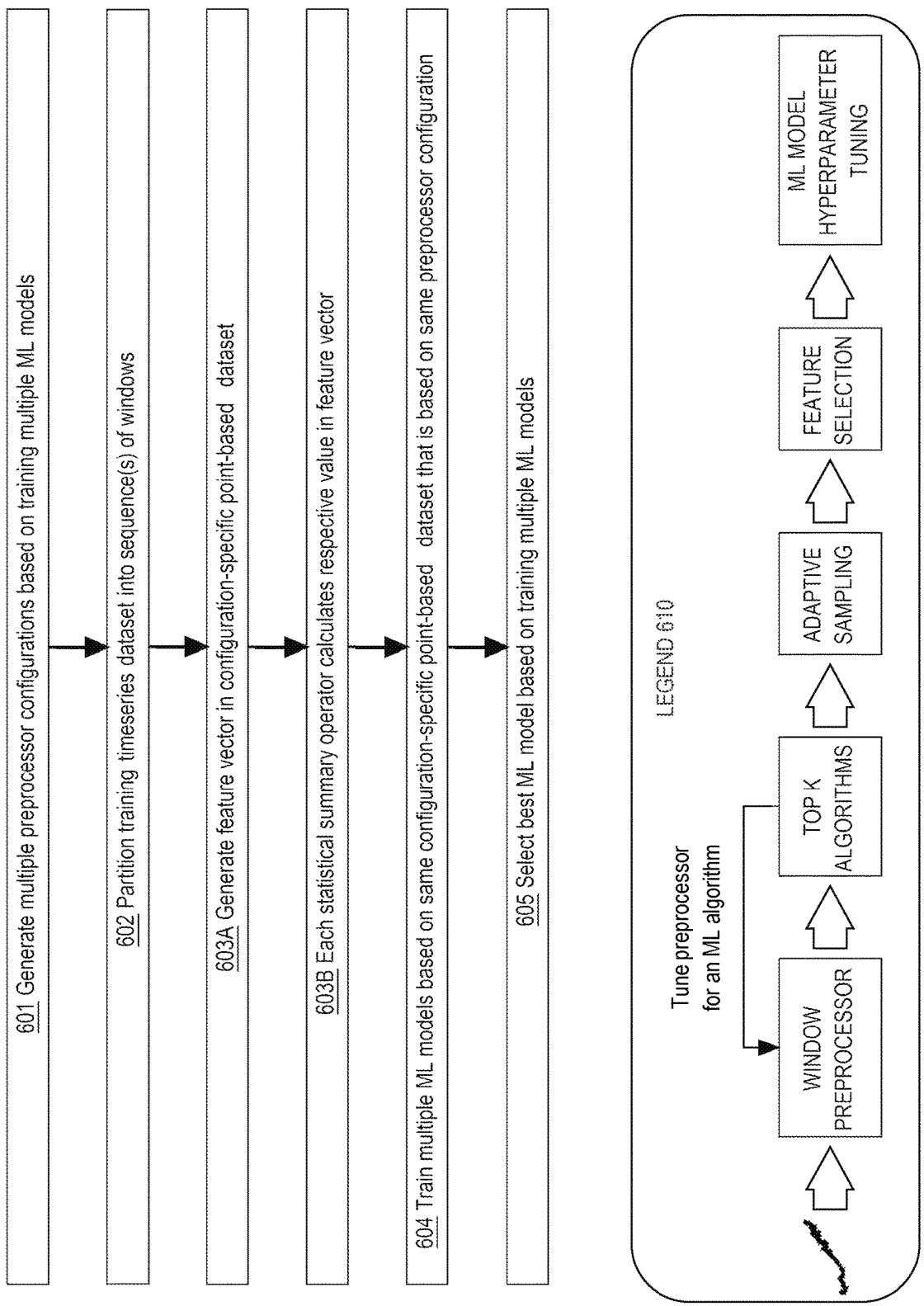
FIG. 6 is a flow diagram that depicts an example computer process that discovers an optimal preprocessor configuration and an optimal ML algorithm.

FIG. 6 is a flow diagram that depicts an example process that a computer performs to discover an optimal preprocessor configuration and an optimal ML algorithm. Although not shown, an ML pipeline may automate some or all of the steps shown in FIG. 6.

Steps 601 and 604-605 may operate an ML pipeline at a macroscopic level for discovery of an optimal preprocessor configuration and an optimal ML algorithm. Steps 601 and 604-605 are exemplary but not limiting, such that optimization and discovery techniques herein may reorder and/or skip any of steps 601 and 604-605.

Steps 602 and 603A-B operate an experimental preprocessor configuration at a microscopic level. ML pipeline operation by steps 601 and 604-605 may score hundreds or thousands of experimental preprocessor configurations to discover an optimal preprocessor configuration. For example, ML pipeline step 601 may entail repeating steps 602 and 603A-B hundreds or thousands of times.

The process of FIG. 6 is shown as a linear sequence of steps. However, exploratory techniques such as gradient descent insert feedback loop(s) (not shown) into control flows such that a subsequent step may cause some previous step(s) to recur. For example, gradient descent may entail looping based on feedback during a control flow such as generating preprocessor configuration(s), followed by scoring to calculate gradient, followed by looping back to generate somewhat similar preprocessor configuration(s) based on the gradient for hill climbing, and so on. Especially in an ML pipeline, various other feedback loops may occur. For example, other gradient descents may iteratively tune other artifacts such as ML model hyperparameters.

Step 601 generates multiple preprocessor configurations based on training multiple ML models of same or different ML algorithms. For example as explained earlier herein, scoring a preprocessor configuration entails training an ML model. In one example, one ML model may be an artificial neural network, and another ML model may be a support vector machine. In another example, one ML model is an artificial neural network with one hyperparameters configuration, and another ML model may have a same artificial neural network implementation but with a different hyperparameters configuration.

Even exotic point-based ML models that were considered unsuitable for generating actionable inferences from timeseries data may be used such as an autoencoder or principal component analysis (PCA). For example, an autoencoder was understood to assist with preprocessing timeseries data such as for neural encoding such as for dimensionality reduction, but the autoencoder was not used to generate a final inference from a timeseries. Always the autoencoder previously had delegated final inferencing to another ML model that was not an autoencoder. That is, an autoencoder was previously unused as a sole and final ML model for timeseries data.

In any case, step 601 acknowledges that using only one ML model to explore the preprocessor configuration space is less likely to discover an optimal preprocessor configuration. Step 601 may support various approaches such as: a) using many ML models to find a generally best preprocessor configuration, or b) finding a respective best preprocessor configuration for each ML model.

As discussed above, steps 602 and 603A-B are small enough to be part of a same ML pipeline stage (such as step 601) and/or repeated in multiple ML pipeline stages. Step 602 partitions a training timeseries dataset into sequence(s) of windows according to a preprocessor configuration such as by repeatedly repositioning sliding window(s) as discussed earlier for FIG. 3.

Steps 603A-B may or may not be combined but are not combined for demonstration. Step 603A generates a feature vector in a configuration-specific point-based dataset being generated by a window preprocessor. As discussed earlier herein, feature vector, output record, and point-based record are synonyms. In particular, a feature vector implies data ready to be accepted as input by an ML model. A feature vector may be a one-dimensional vector of contiguous values of same or different datatypes. For example, a feature vector may be stored in various formats such as a row in a database table, an array in memory, or as a set of key-value pairs such as a dictionary such as a JavaScript object notation (JSON) object having named fields Step 603B populates the feature vector with a respective value for each derived feature. In step 603B, each statistical summary operator calculates a respective value in feature vector from a respective original feature. As explained earlier herein, calculating a respective value of each derived feature entails executing a respective operation specified by the preprocessor configuration to apply a statistical summary operator to an original feature such as max(price). Also as explained earlier herein, a separate instance of a feature vector is generated and populated for each positioned window in each window sequence, such that steps 603A-B are repeated until a configuration-specific output dataset is fully populated.

Step 604 trains multiple ML models based on a same configuration-specific point-based dataset that is based on a preprocessor configuration. For example, multiple ML models may be used to generate multiple respective scores for a same preprocessor configuration such as to select a best score or calculate an average score. Such multi-scoring of a same preprocessor configuration with a same configuration-specific output dataset may or may not facilitate subsequent step 605 as follows.

Step 605 selects a best ML model based on training multiple ML models such as with same or different configuration-specific point-based datasets and same or different preprocessor configurations. As explained earlier herein, even after all of the exploratory trainings of multiple ML models by an ML pipeline such as for earlier steps of FIG. 6, production-ready training might not have occurred. For example, exploratory training for scoring may entail a small training dataset, few training iterations, and/or an increased learning rate such that more thorough training may increase the accuracy of a best ML model. Thus, whether the best ML model selected by step 605 is fully trained may depend on whether previous stage(s) in the ML pipeline are thorough instead of accelerated. In any case, step 605 may select an ML model with a highest accuracy as the best ML model, and further training may increase that accuracy.

6.1 ML Pipeline

Shown legend 610 is not part of the multistep process of FIG. 6. Legend 610 is shown for demonstration to informally depict an overview of an example ML pipeline. The white arrows indicate that workflow proceeds from left to right through the ML pipeline. As shown, an input timeseries enters the ML pipeline on the left of legend 610. The rectangles are stages of the ML pipeline.

As shown, the window preprocessor is the first stage, which converts the input timeseries into an output point-based dataset that is reused to train and score multiple ML algorithms in the second stage that is shown as "top K algorithms". For example the best four of ten ML algorithms may be selected based on accuracy.

As a control loop, the backwards arrow shows that those selected few best algorithms are reused to further tune the window preprocessor by more intensive exploration of the preprocessor configuration space. Initially, four of ten ML algorithms may be sent back for preprocessor configuration exploration. However, the control loop may repeatedly engage such that: a) a first loop iteration does cursory preprocessor exploration with ten available ML algorithms of dubious quality; b) a second loop iteration does more thorough preprocessor exploration with a best four of the ten ML algorithms; and a third iteration may intensively occur with a best two of those four such that a single best ML algorithm can be confidently selected based on accuracy.

The best ML algorithm is promoted through the rest of the ML pipeline as follows. As shown, an adaptive sampling stage decides which feature vectors in a configuration-specific point-based dataset are relevant and which others are irrelevant to training so that thorough training of the best ML algorithm is accelerated.

As shown, a feature selection stage decides which derived features are relevant and which others are irrelevant to training and inferencing. Feedback not shown may also remove the irrelevant features from the already-selected best preprocessor configuration. In other words, preprocessor tuning already found a best preprocessor configuration that has a best accuracy score, but that best preprocessor configuration can be further optimized by feature selection that removes irrelevant features.

Feature selection does not improve accuracy but instead makes configuration-specific point-based datasets and the best ML model more compact without affecting accuracy, which increases efficiency, especially for real-time live streaming production inferencing where millions or billions of point-based records may be processed by the ML model every day such that a small latency improvement for inferencing one point-based record scales to a large increase in ML model throughput during peak hours.

As shown, a hyperparameter tuning stage explores the hyperparameter configuration space of the ML model to ensure that the model is optimized such as before final training that makes the ML model ready for production deployment. Hyperparameter optimization may entail gradient descent, training, and accuracy scoring to measure gradient and/or detect convergence.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
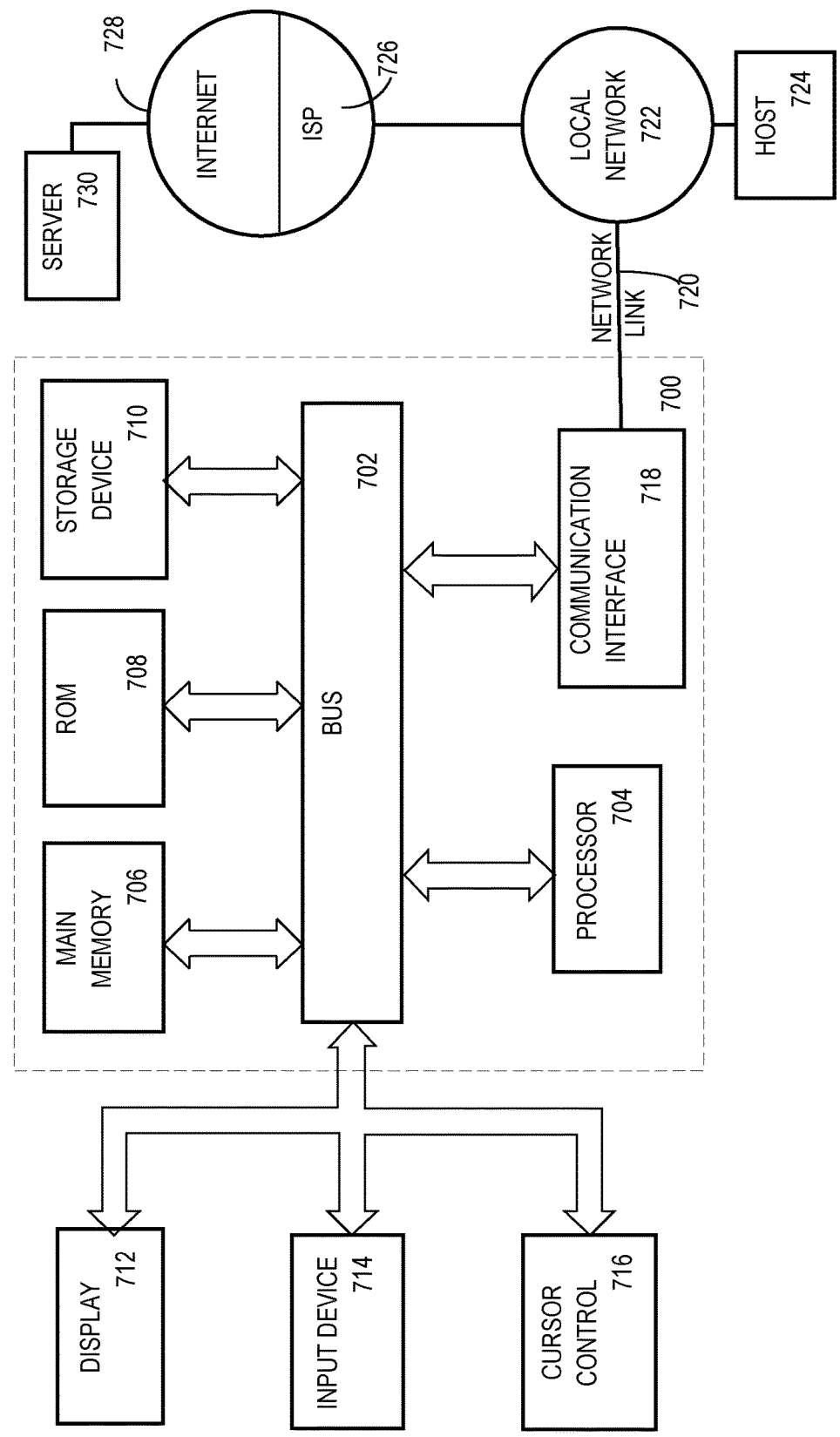
FIG. 7 is a block diagram that illustrates a computer system upon which an embodiment of the invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

Software Overview

Figure 8:
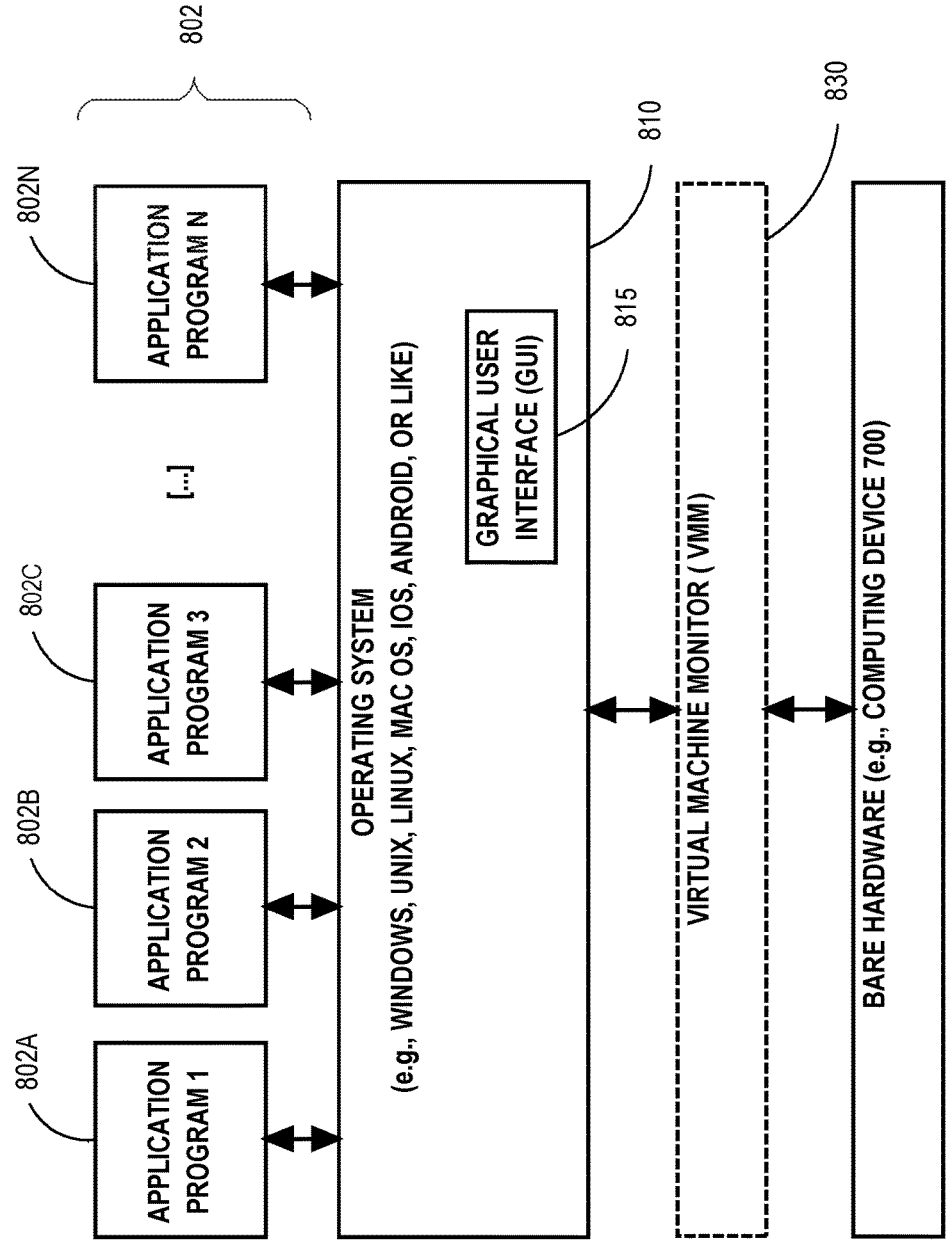
FIG. 8 is a block diagram that illustrates a basic software system that may be employed for controlling the operation of a computing system.

FIG. 8 is a block diagram of a basic software system 800 that may be employed for controlling the operation of computing system 700. Software system 800 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 800 is provided for directing the operation of computing system 700. Software system 800, which may be stored in system memory (RAM) 706 and on fixed storage (e.g., hard disk or flash memory) 710, includes a kernel or operating system (OS) 810.

The OS 810 manages low-level aspects of computer operation, including managing execution of processes, memory allocation, file input and output (I/O), and device I/O. One or more application programs, represented as 802A, 802B, 802C . . . 802N, may be "loaded" (e.g., transferred from fixed storage 710 into memory 706) for execution by the system 800. The applications or other software intended for use on computer system 700 may also be stored as a set of downloadable computer-executable instructions, for example, for downloading and installation from an Internet location (e.g., a Web server, an app store, or other online service).

Software system 800 includes a graphical user interface (GUI) 815, for receiving user commands and data in a graphical (e.g., "point-and-click" or "touch gesture") fashion. These inputs, in turn, may be acted upon by the system 800 in accordance with instructions from operating system 810 and/or application(s) 802. The GUI 815 also serves to display the results of operation from the OS 810 and application(s) 802, whereupon the user may supply additional inputs or terminate the session (e.g., log off).

OS 810 can execute directly on the bare hardware 820 (e.g., processor(s) 704) of computer system 700. Alternatively, a hypervisor or virtual machine monitor (VMM) 830 may be interposed between the bare hardware 820 and the OS 810. In this configuration, VMM 830 acts as a software "cushion" or virtualization layer between the OS 810 and the bare hardware 820 of the computer system 700.

VMM 830 instantiates and runs one or more virtual machine instances ("guest machines"). Each guest machine comprises a "guest" operating system, such as OS 810, and one or more applications, such as application(s) 802, designed to execute on the guest operating system. The VMM 830 presents the guest operating systems with a virtual operating platform and manages the execution of the guest operating systems.

In some instances, the VMM 830 may allow a guest operating system to run as if it is running on the bare hardware 820 of computer system 700 directly. In these instances, the same version of the guest operating system configured to execute on the bare hardware 820 directly may also execute on VMM 830 without modification or reconfiguration. In other words, VMM 830 may provide full hardware and CPU virtualization to a guest operating system in some instances.

In other instances, a guest operating system may be specially designed or configured to execute on VMM 830 for efficiency. In these instances, the guest operating system is "aware" that it executes on a virtual machine monitor. In other words, VMM 830 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Machine Learning Models

A machine learning model is trained using a particular machine learning algorithm. Once trained, input is applied to the machine learning model to make a prediction, which may also be referred to herein as a predicated output or output. Attributes of the input may be referred to as features and the values of the features may be referred to herein as feature values.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, executed, and/or as generating an output or predication, a computer system process executing a machine learning algorithm applies the model artifact against the input to generate a predicted output. A computer system process executes a machine learning algorithm by executing software configured to cause execution of the algorithm.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C#, Ruby, Lua, Java, MatLab, R, and Python.

Artificial Neural Networks

An artificial neural network (ANN) is a machine learning model that at a high level models a system of neurons interconnected by directed edges. An overview of neural networks is described within the context of a layered feedforward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input neuron, the activation value is simply an input value for the input. For an activation neuron, the activation value is the output of the respective activation function of the activation neuron.

Each edge from a particular neuron to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation neuron, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L−1 to a layer L. Given the number of neurons in layer L−1 and L is N[L−1] and N[L], respectively, the dimensions of matrix W is N[L−1] columns and N[L] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/serialized form, or other suitable persistent form.

A particular input applied to a neural network comprises a value for each input neuron. The particular input may be stored as vector. Training data comprises multiple inputs, each being referred to as sample in a set of samples. Each sample includes a value for each input neuron. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every neuron in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of neurons and/or edges determines the size of matrices needed to implement a neural network. The smaller the number of neurons and edges in a neural network, the smaller matrices and amount of memory needed to store matrices. In addition, a smaller number of neurons and edges reduces the amount of computation needed to apply or train a neural network. Less neurons means less activation values need be computed, and/or less derivative values need be computed during training.

Properties of matrices used to implement a neural network correspond neurons and edges. A cell in a matrix W represents a particular edge from a neuron in layer L−1 to L. An activation neuron represents an activation function for the layer that includes the activation function. An activation neuron in layer L corresponds to a row of weights in a matrix W for the edges between layer L and L−1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e. amount of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake an I as an L because those letters have similar features. Correct output may have particular value(s), while actual output may have somewhat different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e. ceases to reduce) or vanishes beneath a threshold (i.e. approaches zero). Example mathematical formulae and techniques for feedforward multilayer perceptron (MLP), including matrix operations and backpropagation, are taught in related reference "EXACT CALCULATION OF THE HESSIAN MATRIX FOR THE MULTI-LAYER PERCEPTRON," by Christopher M. Bishop.

Model training may be supervised or unsupervised. For supervised training, the desired (i.e. correct) output is already known for each example in a training set. The training set is configured in advance by (e.g. a human expert) assigning a categorization label to each example. For example, the training set for optical character recognition may have blurry photographs of individual letters, and an expert may label each photo in advance according to which letter is shown. Error calculation and backpropagation occurs as explained above.

Autoencoder

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas, unsupervised training discovers an apt intermediate vocabulary based more or less entirely on statistical tendencies that reliably converge upon optimality with sufficient training due to the internal feedback by regenerated decodings. Techniques for unsupervised training of an autoencoder for anomaly detection based on reconstruction error is taught in non-patent literature (NPL) "VARIATIONAL AUTOENCODER BASED ANOMALY DETECTION USING RECONSTRUCTION PROBABILITY", Special Lecture on IE. 2015 Dec. 27; 2(1):1-18 by Jinwon An et al.

Principal Component Analysis

Principal component analysis (PCA) provides dimensionality reduction by leveraging and organizing mathematical correlation techniques such as normalization, covariance, eigenvectors, and eigenvalues. PCA incorporates aspects of feature selection by eliminating redundant features. PCA can be used for prediction. PCA can be used in conjunction with other ML algorithms.

Random Forest

A random forest or random decision forest is an ensemble of learning approaches that construct a collection of randomly generated nodes and decision trees during a training phase. Different decision trees of a forest are constructed to be each randomly restricted to only particular subsets of feature dimensions of the dataset, such as with feature bootstrap aggregating (bagging). Therefore, the decision trees gain accuracy as the decision trees grow without being forced to over fit training data as would happen if the decision trees were forced to learn all feature dimensions of the dataset. A prediction may be calculated based on a mean (or other integration such as soft max) of the predictions from the different decision trees.

Random forest hyper-parameters may include: number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:
1. A method comprising:
a) for each preprocessor configuration of a plurality of configurations of a window preprocessor for a training timeseries dataset for a machine learning model:

1) the window preprocessor performing based on said preprocessor configuration:
    i) partitioning the training timeseries dataset into one or more sequences of windows, wherein each sequence of said one or more sequences of windows has a distinct window size;
    ii) converting the training timeseries dataset into a configuration-specific point-based dataset that is based on a statistical summary operator of said preprocessor configuration, including performing for each window in each sequence of said one or more sequences of windows:
        generating, for the window, a feature vector in the configuration-specific point-based dataset, and the statistical summary operator calculating a value in the feature vector;
2) training the machine learning model based on said configuration-specific point-based dataset; and
3) calculating a score for said preprocessor configuration based on said training based on said configuration-specific point-based dataset;
b) selecting, based on said scores of the plurality of configurations of the window preprocessor, an optimal preprocessor configuration from the plurality of configurations; and
c) converting, by the window preprocessor and based on the optimal preprocessor configuration, a new timeseries dataset.

2. The method of claim 1 wherein
said preprocessor configuration specifies a plurality of statistical summary operators that includes said statistical summary operator;
said converting the training timeseries dataset into the configuration-specific point-based dataset comprises, for each window in each sequence of said one or more sequences of windows,
    calculating, by each statistical summary operator of the plurality of statistical summary operators, a respective value in the feature vector for the window.

3. The method of claim 2 further comprising generating:
a first preprocessor configuration that specifies a particular set of distinct window sizes, and
a second preprocessor configuration that does not specify at least one selected from the group consisting of:
    said particular set of distinct window sizes, and
    a same amount of distinct window sizes.

4. The method of claim 2 further comprising generating:
a first preprocessor configuration that specifies a particular stride amount for a particular window size, and
a second preprocessor configuration that specifies a different stride amount for same said particular window size.

5. The method of claim 1 further comprising generating:
a first preprocessor configuration that specifies using a particular statistical summary operator with a particular argument, and
a second preprocessor configuration that does not specify using at least one selected from the group consisting of:
    said particular statistical summary operator, and
    said particular statistical summary operator with said particular argument, and
    a same amount of statistical summary operators as the first preprocessor configuration specifies.

6. The method of claim 1 wherein:
said training timeseries dataset contains a plurality of original features that includes a particular original feature;
the method further comprises generating:
    a first preprocessor configuration that specifies using said particular original feature as an argument of a statistical summary operator, and
    a second preprocessor configuration that does not specify using at least one selected from the group consisting of:
        said particular original feature as an argument of a statistical summary operator, and
        a same amount of original features as the first preprocessor configuration specifies.

7. The method of claim 1 further comprising generating said plurality of configurations of the window preprocessor based on at least one selected from the group consisting of a gradient and a random number.

8. The method of claim 1 further comprising:
training a plurality of machine learning models based on said configuration-specific point-based dataset that is based on said preprocessor configuration;
selecting said machine learning model based on said training said plurality of machine learning models.

9. The method of claim 8 further comprising generating said plurality of configurations of the window preprocessor based on said training said plurality of machine learning models.

10. The method of claim 1 wherein said window preprocessor for said training timeseries dataset for said machine learning model comprises a window preprocessor for said training timeseries dataset for a model selected from the group consisting of: an autoencoder, and a principal component analysis (PCA).

11. The method of claim 1 wherein:
said machine learning model is a point-based machine learning model;
said window preprocessor for said training timeseries dataset for said machine learning model comprises a window preprocessor selected from the group consisting of:
    a window preprocessor for a nontemporal sequential dataset for said point-based machine learning model, and
    a window preprocessor for a timeseries dataset of quotes for said point-based machine learning model.

12. The method of claim 11 wherein said window preprocessor for said nontemporal sequential dataset for said machine learning model comprises a window preprocessor for a dataset selected from the group consisting of:
    a single sequence of nucleic acids or amino acids for said machine learning model, and
    a path geometry for said machine learning model.

13. One or more non-transitory computer-readable media storing instructions that, when executed by one or more processors, cause:
a) for each preprocessor configuration of a plurality of configurations of a window preprocessor for a training timeseries dataset for a machine learning model:
    1) the window preprocessor performing based on said preprocessor configuration:
        i) partitioning the training timeseries dataset into one or more sequences of windows, wherein each sequence of said one or more sequences of windows has a distinct window size;
        ii) converting the training timeseries dataset into a configuration-specific point-based dataset that is based on a statistical summary operator of said preprocessor configuration, including performing for each window in each sequence of said one or more sequences of windows:
  generating, for the window, a feature vector in the configuration-specific point-based dataset, and the statistical summary operator calculating a value in the feature vector;
2) training the machine learning model based on said configuration-specific point-based dataset; and
3) calculating a score for said preprocessor configuration based on said training based on said configuration-specific point-based dataset;

b) selecting, based on said scores of the plurality of configurations of the window preprocessor, an optimal preprocessor configuration from the plurality of configurations; and c) converting, by the window preprocessor and based on the optimal preprocessor configuration, a new timeseries dataset.

14. The one or more non-transitory computer-readable media of claim 13 wherein
said preprocessor configuration specifies a plurality of statistical summary operators that includes said statistical summary operator;
said converting the training timeseries dataset into the configuration-specific point-based dataset comprises, for each window in each sequence of said one or more sequences of windows,
  calculating, by each statistical summary operator of the plurality of statistical summary operators, a respective value in the feature vector for the window.

15. The one or more non-transitory computer-readable media of claim 14 wherein the instructions further cause generating:
a first preprocessor configuration that specifies a particular set of distinct window sizes, and
a second preprocessor configuration that does not specify at least one selected from the group consisting of:
  said particular set of distinct window sizes, and
  a same amount of distinct window sizes.

16. The one or more non-transitory computer-readable media of claim 14 wherein the instructions further cause generating:
a first preprocessor configuration that specifies a particular stride amount for a particular window size, and
a second preprocessor configuration that specifies a different stride amount for same said particular window size.

17. The one or more non-transitory computer-readable media of claim 13 wherein the instructions further cause generating:
a first preprocessor configuration that specifies using a particular statistical summary operator with a particular argument, and
a second preprocessor configuration that does not specify using at least one selected from the group consisting of:
  said particular statistical summary operator, and
  said particular statistical summary operator with said particular argument, and
a same amount of statistical summary operators as the first preprocessor configuration specifies.

18. The one or more non-transitory computer-readable media of claim 13 wherein the instructions further cause generating said plurality of configurations of the window preprocessor based on at least one selected from the group consisting of a gradient and a random number.

19. The one or more non-transitory computer-readable media of claim 13 wherein the instructions further cause:
training a plurality of machine learning models based on said configuration-specific point-based dataset that is based on said preprocessor configuration;
selecting said machine learning model based on said training said plurality of machine learning models.

20. The one or more non-transitory computer-readable media of claim 13 wherein:
said machine learning model is a point-based machine learning model;
said window preprocessor for said training timeseries dataset for said machine learning model comprises a window preprocessor selected from the group consisting of:
  a window preprocessor for a nontemporal sequential dataset for said point-based machine learning model, and
  a window preprocessor for a timeseries dataset of quotes for said point-based machine learning model.

* * * * *

UNITED STATES PATENT AND TRADEMARK OFFICE
CERTIFICATE OF CORRECTION

PATENT NO. : 11,989,657 B2
APPLICATION NO. : 17/071285
DATED : May 21, 2024
INVENTOR(S) : Chavoshi et al.

It is certified that error appears in the above-identified patent and that said Letters Patent is hereby corrected as shown below:

On the Title Page

On page 2, Column 1, item (56) under Other Publications, Line 17, delete "Applicationsm" and insert -- Applications --, therefor.

On page 2, Column 2, item (56) under Other Publications, Line 54, delete "fro" and insert -- for --, therefor.

On page 3, Column 2, item (56) under Other Publications, Line 38, delete ""E cient" and insert -- "Efficient --, therefor.

On page 3, Column 2, item (56) under Other Publications, Line 40, delete "Artifical" and insert -- Artificial --, therefor.

On page 3, Column 2, item (56) under Other Publications, Line 47, delete "Microsodt" and insert -- Microsoft --, therefor.

On page 4, Column 1, item (56) under Other Publications, Line 20, delete "Sequwnrial" and insert -- Sequential --, therefor.

On page 4, Column 1, item (56) under Other Publications, Line 21, delete "Communicaitons" and insert -- Communications --, therefor.

On page 4, Column 1, item (56) under Other Publications, Lines 27-28, delete "Seletion" and insert -- Selection --, therefor.

On page 4, Column 1, item (56) under Other Publications, Line 30, delete "Algotithm" and insert -- Algorithm --, therefor.

On page 4, Column 2, item (56) under Other Publications, Line 30, delete "AutoAl" and insert Signed and Sealed this
Twenty-fourth Day of September, 2024

Katherine Kelly Vidal
*Director of the United States Patent and Trademark Office*

CERTIFICATE OF CORRECTION (continued)
U.S. Pat. No. 11,989,657 B2

-- AutoAI --, therefor.

In the Specification

In Column 20, Line 24, delete "fields" and insert -- fields. --, therefor.

In Column 28, Line 52, delete "and or" and insert -- and/or --, therefor.